(12) United States Patent
Oohara et al.

(10) Patent No.: US 8,334,606 B2
(45) Date of Patent: Dec. 18, 2012

(54) WIND POWER GENERATION SYSTEM OF A TYPE PROVIDED WITH POWER STORAGE SYSTEM

(75) Inventors: Shinya Oohara, Hitachinaka (JP); Naoki Hoshino, Hitachi (JP); Takeshi Iwata, Hitachi (JP)

(73) Assignee: Hitachi Engineering & Services Co., Ltd., Ibaraki (JP)

( * ) Notice: Subject to any disclaimer, the term of this patent is extended or adjusted under 35 U.S.C. 154(b) by 500 days.

(21) Appl. No.: 12/539,945

(22) Filed: Aug. 12, 2009

(65) Prior Publication Data

US 2009/0295162 A1 Dec. 3, 2009

(51) Int. Cl.
*F03D 9/00* (2006.01)
*H02P 9/04* (2006.01)

(52) U.S. Cl. .......................................................... 290/44

(58) Field of Classification Search .................... 290/44, 290/55; 322/44, 89; 700/286, 287, 288; 307/11, 57
See application file for complete search history.

(56) References Cited

U.S. PATENT DOCUMENTS

| | | | | |
|---|---|---|---|---|
| 2,539,862 | A * | 1/1951 | Rushing | 62/230 |
| 7,566,981 | B2 * | 7/2009 | Kunkel et al. | 290/44 |
| 2003/0015876 | A1 * | 1/2003 | Ichinose et al. | 290/44 |
| 2005/0200133 | A1 * | 9/2005 | Wobben | 290/55 |
| 2006/0087124 | A1 * | 4/2006 | Stahlkopf | 290/44 |
| 2007/0138797 | A1 * | 6/2007 | Reidy et al. | 290/44 |
| 2008/0179887 | A1 | 7/2008 | Kawazoe et al. | |
| 2010/0187828 | A1 * | 7/2010 | Reidy et al. | 290/55 |
| 2010/0259210 | A1 * | 10/2010 | Sasaki et al. | 320/101 |
| 2011/0227343 | A1 * | 9/2011 | Yasugi et al. | 290/44 |

FOREIGN PATENT DOCUMENTS

| | | |
|---|---|---|
| EP | 1 022 838 A2 | 7/2000 |
| EP | 2 110 549 A2 | 10/2009 |
| JP | 59-72147 U | 5/1984 |
| JP | 2000-37097 A | 2/2000 |
| JP | 2000-047741 A | 2/2000 |
| JP | 2002-27679 A | 1/2002 |
| JP | 2002-310929 A | 10/2002 |
| JP | 2005-086953 A | 3/2005 |
| JP | 2006-280020 A | 10/2006 |
| JP | 2007-124780 A | 5/2007 |
| WO | 2007/046547 A2 | 4/2007 |

OTHER PUBLICATIONS

Study result on Possible Linking Capacity of Generated Wind Power to Tohoku Electric Power Grid, Tohoku Power Generation Company, Sep. 3, 2004.

\* cited by examiner

*Primary Examiner* — Julio Gonzalez Ramirez
(74) *Attorney, Agent, or Firm* — Mattingly & Malur, PC

(57) ABSTRACT

A wind power generation system having a group of wind turbine generators includes a superior controller having a generation power recording memory to record a sum of a generation power of the group of wind turbine generators and a charge and discharge power of a power storage system, a charge and discharge power command computing device for computing a charge and discharge power command for the power storage system in a second period by making use of information of the output power in a first period computed in the output power computing unit and information of a detection value at the present of the generation power recording memory, and a charge and discharge power control device.

18 Claims, 36 Drawing Sheets

FIG. 17

| CONTROL METHOD | NO CONTROL | FIRST ORDER DELAY FOLLOW UP | | | FIRST ORDER DELAY FOLLOW UP + FIXED WIDTH | | | | | | | | | PRESENT INVENTION |
|---|---|---|---|---|---|---|---|---|---|---|---|---|---|---|
| FIXED WIDTH | — | (±0%) | | | ±1% | | | ±3% | | | ±5% | | | — |
| FIRST ORDER DELAY TIME CONSTANT | — | 120 MINUTE | 180 MINUTE | 240 MINUTE | 120 MINUTE | 180 MINUTE | 240 MINUTE | 120 MINUTE | 180 MINUTE | 240 MINUTE | 120 MINUTE | 180 MINUTE | 240 MINUTE | — |
| DEVIATION RATE | 33.9% | 0.2% | 0.0% | 0.0% | 0.2% | 0.0% | 0.0% | 0.5% | 0.1% | 0.0% | 24.6% | 9.1% | 8.4% | 0.0% |
| TOTAL AMOUNT OF CHARGE POWER OF BATTERIES [%] | — | 13.4% | 15.8% | 17.8% | 12.1% | 14.5% | 16.4% | 9.9% | 12.2% | 14.1% | 3.3% | 10.5% | 12.3% | 5.6% |
| TOTAL AMOUNT OF DISCHARGE POWER OF BATTERIES [%] | — | 13.3% | 15.8% | 17.7% | 11.9% | 14.2% | 16.1% | 9.6% | 11.7% | 13.4% | 3.3% | 9.8% | 11.4% | 4.9% |
| LOSS ESTIMATED FROM DISCHARGE POWER (WHEN ASSUMED CHARGE AND DISCHARGE EFFICIENCY AS 70%) | — | 5.7% | 6.8% | 7.6% | 5.1% | 6.1% | 6.8% | 4.1% | 5.0% | 5.8% | 1.4% | 4.2% | 4.9% | 2.1% |

*1) WITHIN BOLD FRAME, DEVIATION RATE 0.0% IS ACHIEVED
*2) DEVIATION RATE IS A RATE WHERE A VARIATION WIDTH DEVIATES OVER 10% IN 20 MINUTES PERIOD BEGINNING FROM ANY ARBITRARY TIMING
*3) % VALUE IS A RELATIVE VALUE WITH RESPECT TO TOTAL AMOUNT OF GENERATION POWER OF GROUP OF WIND TURBINE GENERATORS, WHEN NO CONTROL IS PERFORMED

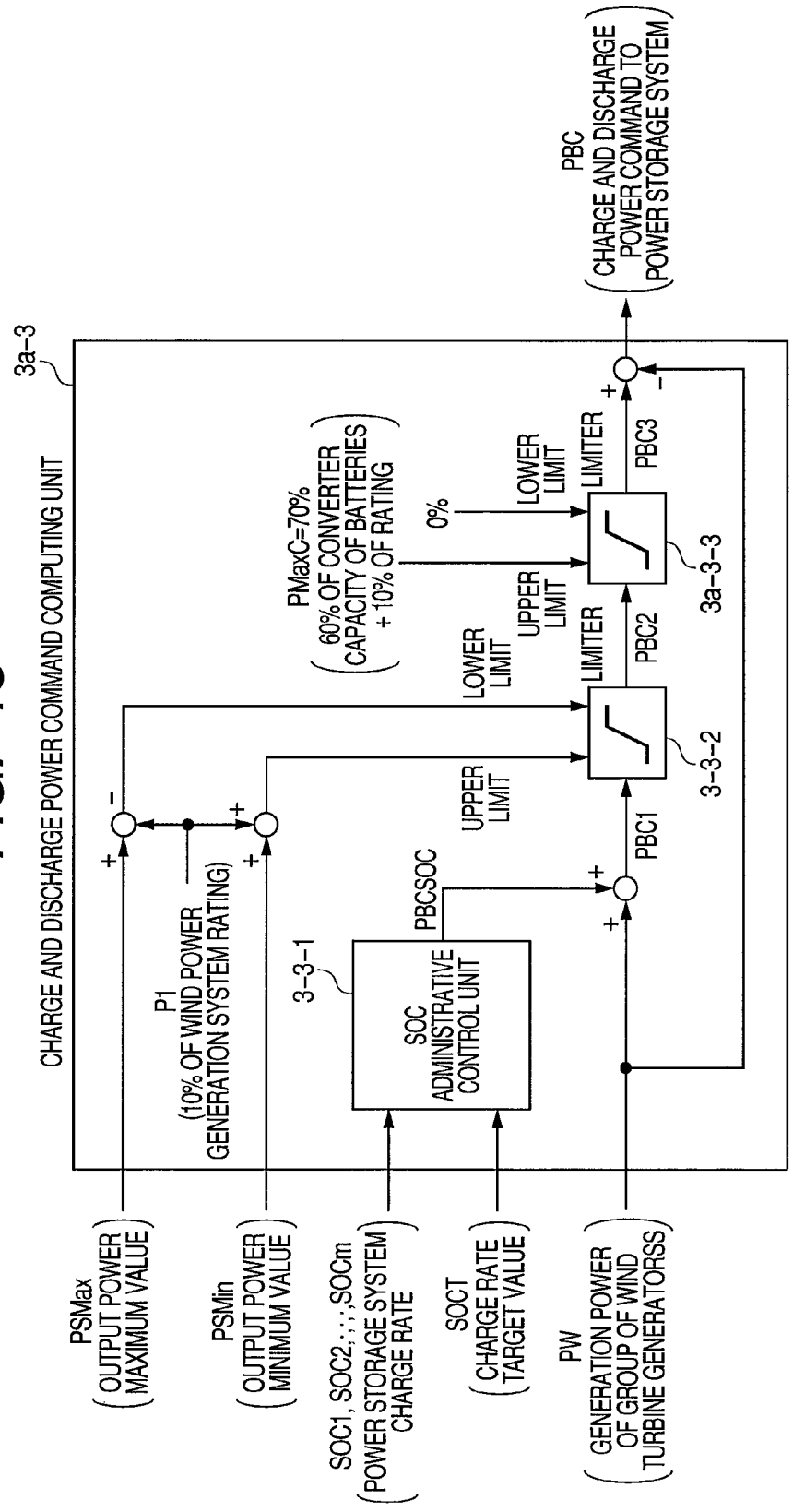

FIG. 37(a)

WHEN A SAME VALUE OF SOC IS SET FOR ALL OF POWER STORAGE DEVICES

|  | SOC | CHARGEABLE POWER | DISCHARGEABLE POWER |
|---|---|---|---|
| POWER STORAGE DEVICE 2-1-1 | 40% | -4% | 4% |
| POWER STORAGE DEVICE 2-1-2 | 40% | -4% | 4% |
| POWER STORAGE DEVICE 2-1-3 | 40% | -4% | 4% |
| POWER STORAGE DEVICE 2-1-4 | 40% | -4% | 4% |
| POWER STORAGE DEVICE 2-1-5 | 40% | -4% | 4% |
| POWER STORAGE DEVICE 2-1-6 | 40% | -4% | 4% |
| POWER STORAGE DEVICE 2-1-7 | 40% | -4% | 4% |
| POWER STORAGE DEVICE 2-1-8 | 40% | -4% | 4% |
| POWER STORAGE DEVICE 2-1-9 | 40% | -4% | 4% |
| POWER STORAGE DEVICE 2-1-10 | 40% | -4% | 4% |
| TOTAL | — | -40% | 40% |
| AVERAGE | 40% | — | — |
| TOTAL AMOUNT OF STORED POWER | 2400[kWh] | — | — |

*) kWh CAPACITY OF INDIVIDUAL BATTERY=600[kWh]

FIG. 37(b)

WHEN SOC IS VARIED FOR EVERY POWER STORAGE DEVICE

|  | SOC | CHARGEABLE POWER | DISCHARGEABLE POWER |
|---|---|---|---|
| POWER STORAGE DEVICE 2-1-1 | 60% | -4% | 8% |
| POWER STORAGE DEVICE 2-1-2 | 60% | -4% | 8% |
| POWER STORAGE DEVICE 2-1-3 | 60% | -4% | 8% |
| POWER STORAGE DEVICE 2-1-4 | 60% | -4% | 8% |
| POWER STORAGE DEVICE 2-1-5 | 60% | -4% | 8% |
| POWER STORAGE DEVICE 2-1-6 | 60% | -4% | 8% |
| POWER STORAGE DEVICE 2-1-7 | 10% | -4% | 4% |
| POWER STORAGE DEVICE 2-1-8 | 10% | -4% | 4% |
| POWER STORAGE DEVICE 2-1-9 | 10% | -4% | 4% |
| POWER STORAGE DEVICE 2-1-10 | 10% | -4% | 4% |
| TOTAL | — | -40% | 64% |
| AVERAGE | 40% | — | — |
| TOTAL AMOUNT OF STORED POWER | 2400[kWh] | — | — |

*) kWh CAPACITY OF INDIVIDUAL BATTERY=600[kWh]

WIND POWER GENERATION SYSTEM OF A TYPE PROVIDED WITH POWER STORAGE SYSTEM

BACKGROUND OF THE INVENTION

1. Field of the Invention

The present invention relates to a wind power generation system provided with a power storage system and a windmill power generation system.

2. Description of the Related Art

As a measure of converting naturally occurring renewable energy into electric power energy, a group of wind turbine generators is utilized.

Since an energy source for the group of wind turbine generators is temporally varying wind energy, the power generated by the group of wind turbine generators also varies temporally.

In an electric power system, a power generated by a large scaled power generator is adjusted depending on the magnitude of a power demand and a balance of the power supply and demand is maintained. For this reason, when many groups of wind turbine generators which are power sources with large variation are linked to an electric power system as disclosed in non-patent document 1, it is concerned about a shortage of adjusting capacity and an expansion of frequency variation.

In order to prevent the above problem, as disclosed, for example, in patent document 1, such a measure is necessitated that a group of wind turbine generators is provided with a power storage system so as to mitigate a variation of power generated by the group of wind turbine generators, which flows out to an electric power system, by means of charging to or discharging from the power storage system.

Patent document 1: Japanese Patent Application Laid-open No. 2007-124780

Non-patent document 1: "Study result on Possible Linking Capacity of Generated Wind Power to Tohoku Electric Power Grid" Tohoku Power Generation Company, Sep. 3, 2004

SUMMARY OF THE INVENTION

As disclosed in non-patent document 1, the power variation being the object for the mitigation is divided into a few regions depending on its variation cycles. In particular, with regard to a variation of about a few minutes to 20 minutes which is called as an intermediate cycle region, it is feared that such variation leads such as to as an expansion of power supply and demand unbalance due to shortage of adjustment capacity and to an expansion of frequency variation. In order to avoid the adverse effects due to power variation in such intermediate cycle region, it is necessary to mitigate power variation in this frequency band. More specifically, it is desirable to suppress an output variation width of the output power in a predetermined period (for example, within 20 minutes) beginning from any arbitrary timing within a predetermined fixed value (for example, 10% of rated value of a wind power generation system).

As a measure for mitigating a power variation in the intermediate cycle region, there is a measure, for example, as disclosed in patent document 1 in which a predetermined range with regard to an average value of power generated by a group of wind turbine generators is set and only when the power generated deviates the predetermined range, charging or discharging of batteries is performed.

However, when the control method as disclosed in patent document 1 is employed, since a simple output target value of an average value of the power generated for mitigating the objective variation in the intermediate cycle region is used, it is feared to cause an unnecessary charging or discharging of the batteries which does not contribute to mitigate the variation in the intermediate cycle region.

A charging and discharging operation of a battery inevitably accompanies a loss inside the battery. For this reason, since a charging and discharging which does not contribute to mitigate the variation increases a loss, it is feared that natural energy cannot be utilized effectively to its maximum.

An object of the present invention is, in a wind power generation system provided with batteries, to suppress an output variation in a predetermined frequency region as well as to reduce a power loss being accompanied with charging and discharging of the batteries.

In the present invention, a possible output range in a subsequent control period (control cycle) is determined from the maximum value and the minimum value of an output power of a group of wind turbine generators and a power storage system in a predetermined past period. In the subsequent control period, any one of charging and discharging power of the power storage system and a power limiting command for the group of wind turbine generators or the both are determined so that a sum of the output powers of the group of wind turbine generators and the power storage system stays within the possible output range.

Further, in the present invention, the wind power generation system includes means for receiving a generation power prediction value depending on weather forecast and any one of charging rate command of the power storage system and a power limiting command for the group of wind turbine generators or the both are determined in response to the generation power prediction value.

With the present invention, an output power variation in a frequency region, which is an object for suppression, can be suppressed as well as to reduce a loss being accompanied with charging and discharging of the batteries can be reduced.

BRIEF DESCRIPTION OF THE DRAWINGS

FIG. 17 is a table representing advantages of the present invention in the first embodiment of the present invention;

FIG. 18 is a diagram showing a charging and discharging power command preparing means in a second embodiment of the present invention;

FIG. 20 (b) is a diagram showing an example of operations of the wind power generation system when an upper output limit of the system is set in the second embodiment of the present invention;

FIG. 26 (b) is a diagram showing an example of operations of the wind power generation system when a generation power prediction value is used in the third embodiment of the present invention;

FIG. 27 (b) is a diagram showing an example of operations of the wind power generation system when a generation power prediction value is used in the third embodiment of the present invention;

FIG. 34 (b) is a diagram showing a control operation in the fifth embodiment of the present invention;

FIG. 37 (a) is a diagram showing a conventional charge rate control in the sixth embodiment of the present invention; and FIG. 37 (b) is a diagram showing a charge rate control of the present invention in the sixth embodiment of the present invention.

FIG. 39 (b) is a diagram showing an exemplary operation of a wind power generation plant when a power limiting control is applied to the seventh embodiment of the present invention.

DETAILED DESCRIPTION OF THE PREFERRED EMBODIMENTS

Figure 1:
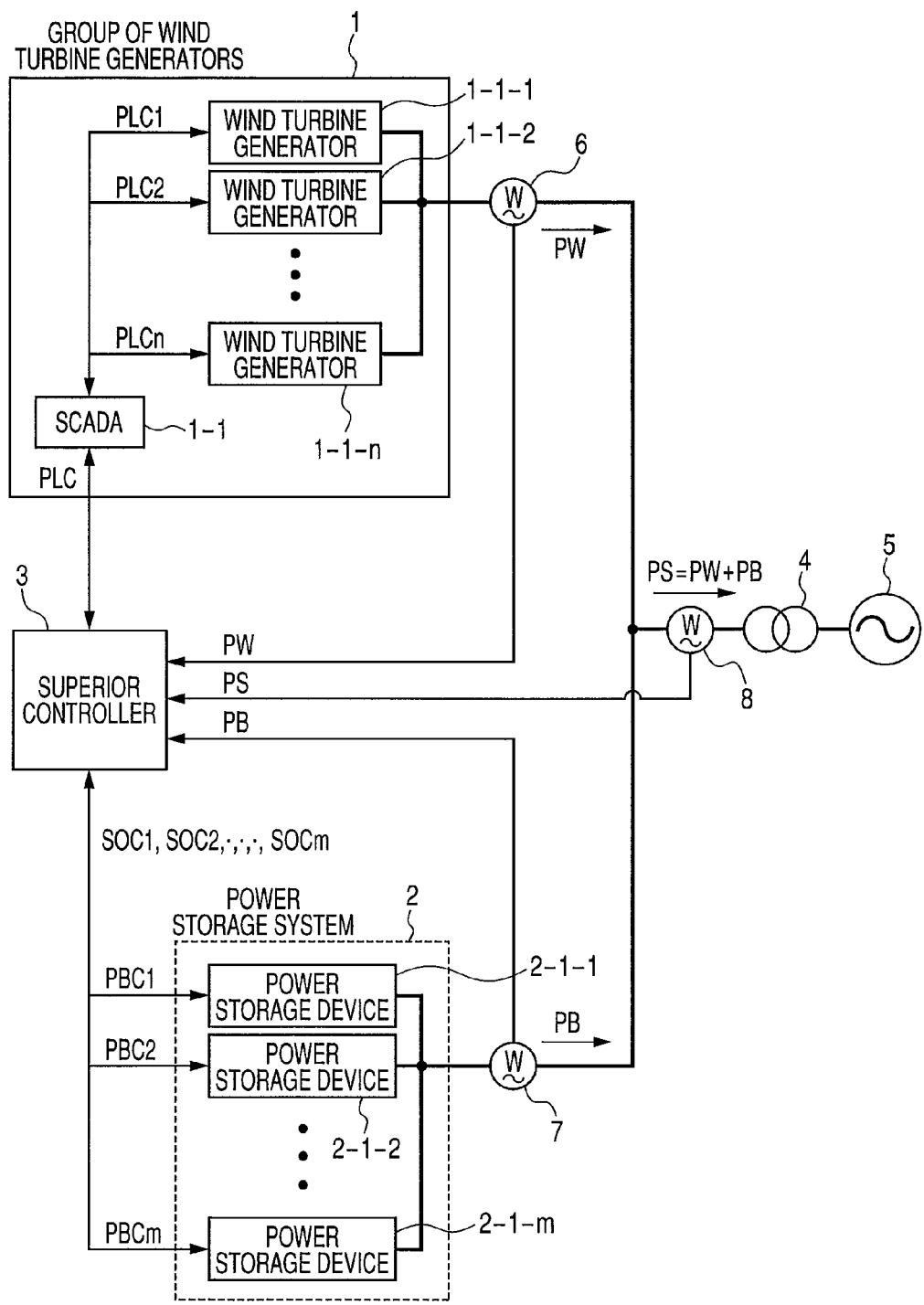
FIG. 1 is a diagram showing configuration of a wind power generation system in a first embodiment of the present invention.

In a wing power generation system of the present invention, a possible output range R in a subsequent control period T2 in future is set from the maximum value and the minimum value of a sum of an output power of a group of wind turbine generators and a power storage system in a predetermined period T1 in past. The power storage system performs a charging or discharging operation only when a generation power of the group of wind turbine generators deviates from the possible output range R or when a charge rate of batteries deviates from a target charge rate. The wind power generation system renews the possible output range every control cycle T2.

Further, the wing power generation system of the present invention computes a power limiting command in subsequent predetermined time T3 in future from the minimum value of a sum of an output power of the group of wind turbine generators and the power storage system in a predetermined period T1 in past and a chargeable power of the batteries, and the group of wind turbine generators configured by more than one wind turbine generators limits the generation power of the group of wind turbine generators below the limiting command in a predetermined time in future.

[Embodiment 1]

A first embodiment of the present invention will be explained with reference to FIG. 1 through FIG. 17.

A configuration of a wind power generation system, which is an object of the present embodiment, will be explained with reference to FIG. 1. The wind power generation system of the present embodiment is configured by a group of wind turbine generators 1, a power storage system 2, a superior controller 3 and a linking transformer 4. The wind power generation system links with an electric power system 5 and the electric power generated is transmitted to the electric power system 5. At a linking point of the group of wind turbine generators, a wattmeter 6 for measuring a generation power PW of the group of wind turbine generators is disposed. Further, at a linking point of the wind power generators, a wattmeter 8 for measuring a generation power PS of the wind turbine generators is disposed. In the wind power generation system, at a linking point of the power storage system, a wattmeter 7 for measuring a charging and discharging power PB of the power storage system is disposed, the generation power PS of the wind turbine generators may calculate from the generation power PW of the wind power generation system and the charging and discharging power PB of the power storage system. However, in control performance of the system, measuring the generation power PS directly by the wattmeter 8 is superior to calculating the generation power PS from the generation power PW and the charging and discharging power PB. Further, a relationship expressed by the following formula 1 stands between an output power PS of the wind power generation system, PW and PB, if loss is excluded.

$$PS=PW+PB \qquad \text{(Formula 1)}$$

The group of wind turbine generators 1 constituting the wind power generation system will be explained herein below. The group of wind turbine generators 1 is constituted by more than one wind turbine generators 1-1-1, 1-1-2, ... 1-1-n and an SCADA 1-1. The SCADA 1-1 bears a role of collecting operating information such as operating conditions and generation power and the like of the group of wind turbine generators 1. At the same time, the SCADA 1-1 receives a generation power limiting command PLC of the group of wind turbine generators 1 from the superior controller 3 and provides respective power limiting commands PLC1, PLC2, ... PLCn to the individual wind turbine generators 1-1-1, 1-1-2, ... 1-1-n so as to keep the sum of generation power of the individual wind turbine generators 1-1-1, 1-1-2, ... 1-1-n below PLC.

Figure 2:
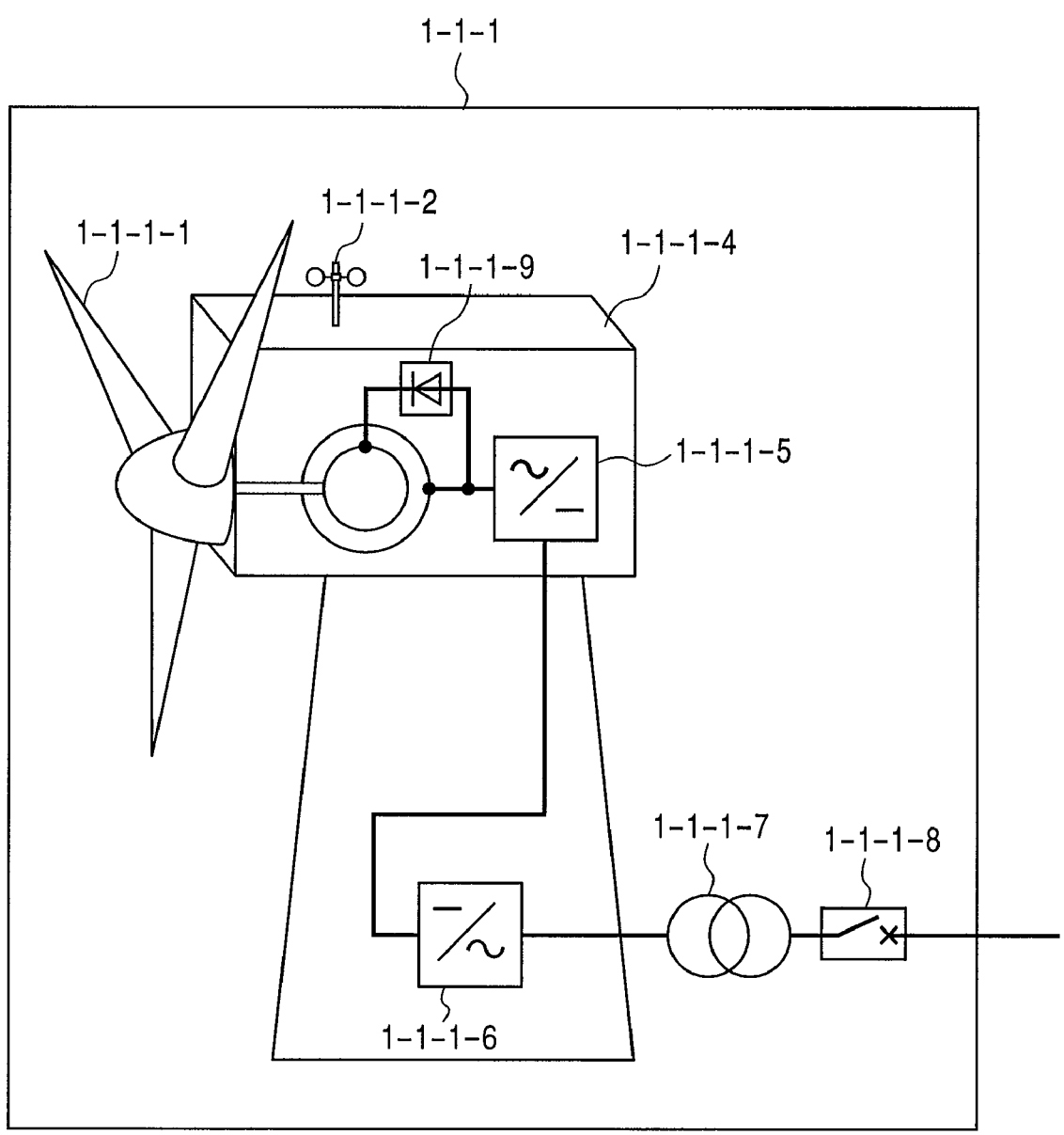
FIG. 2 is a diagram showing an example of a wind turbine generator in the first embodiment of the present invention.
Figure 3:
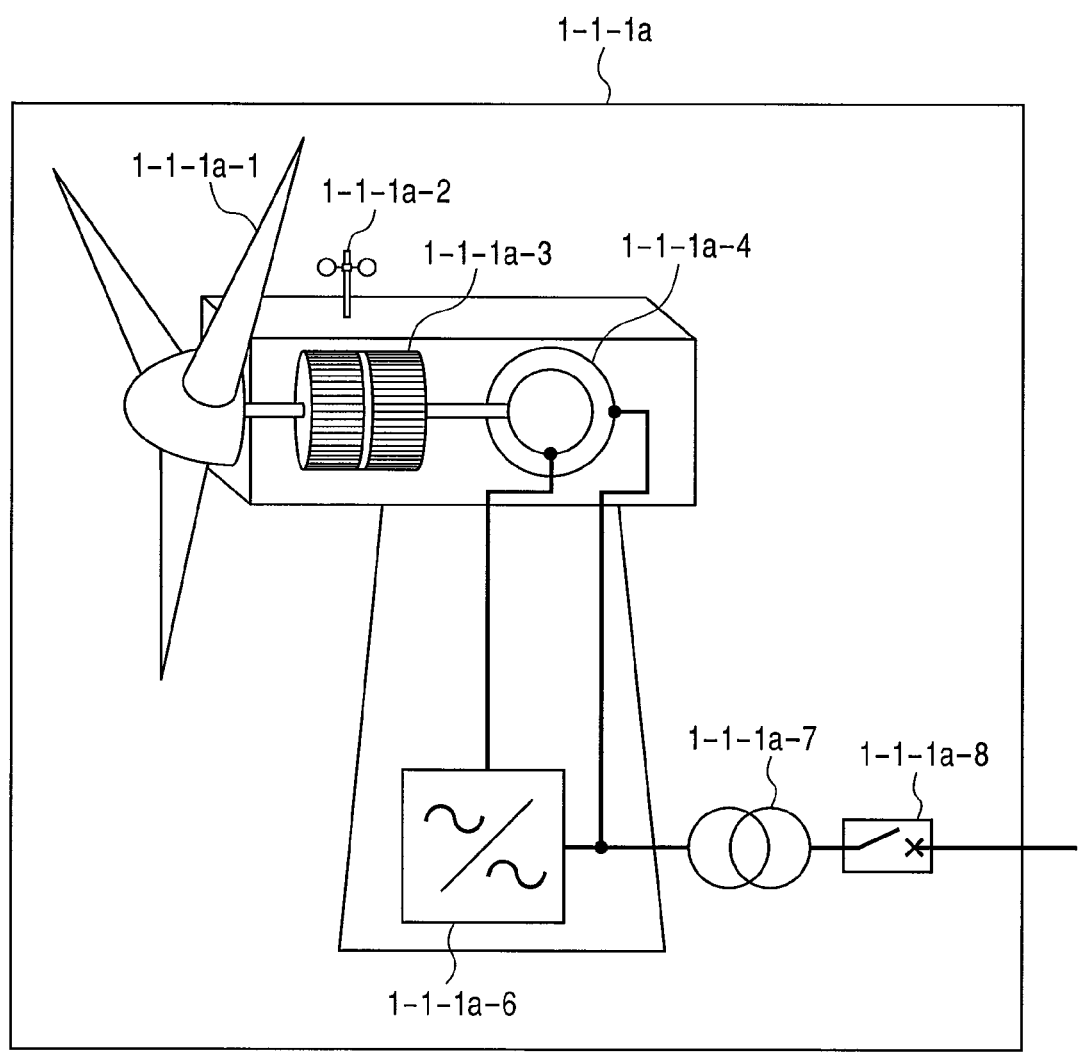
FIG. 3 is a diagram showing an example of a wind turbine generator in the first embodiment of the present invention.
Figure 4:
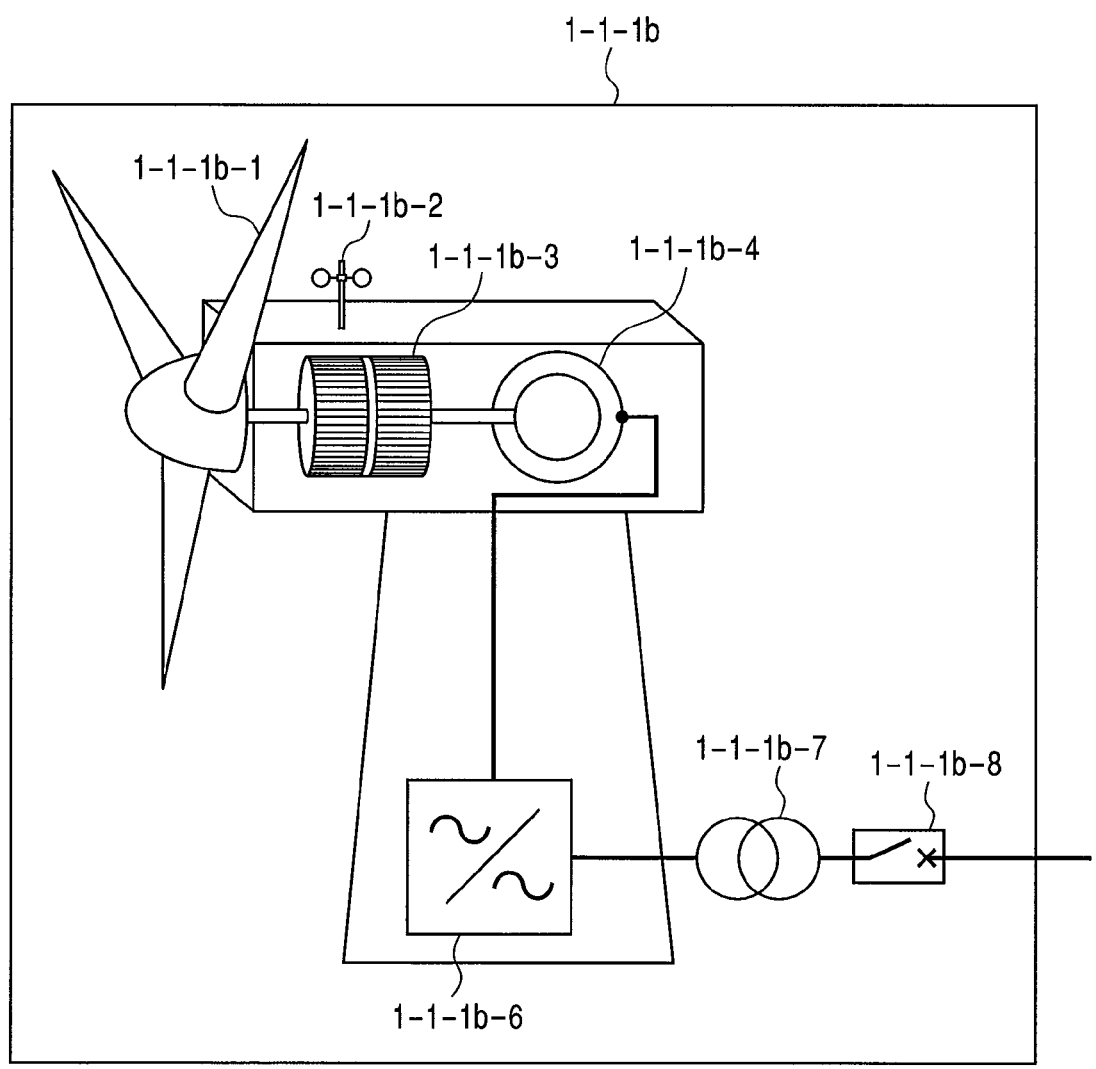
FIG. 4 is a diagram showing an example of a wind turbine generator in the first embodiment of the present invention.
Figure 5:
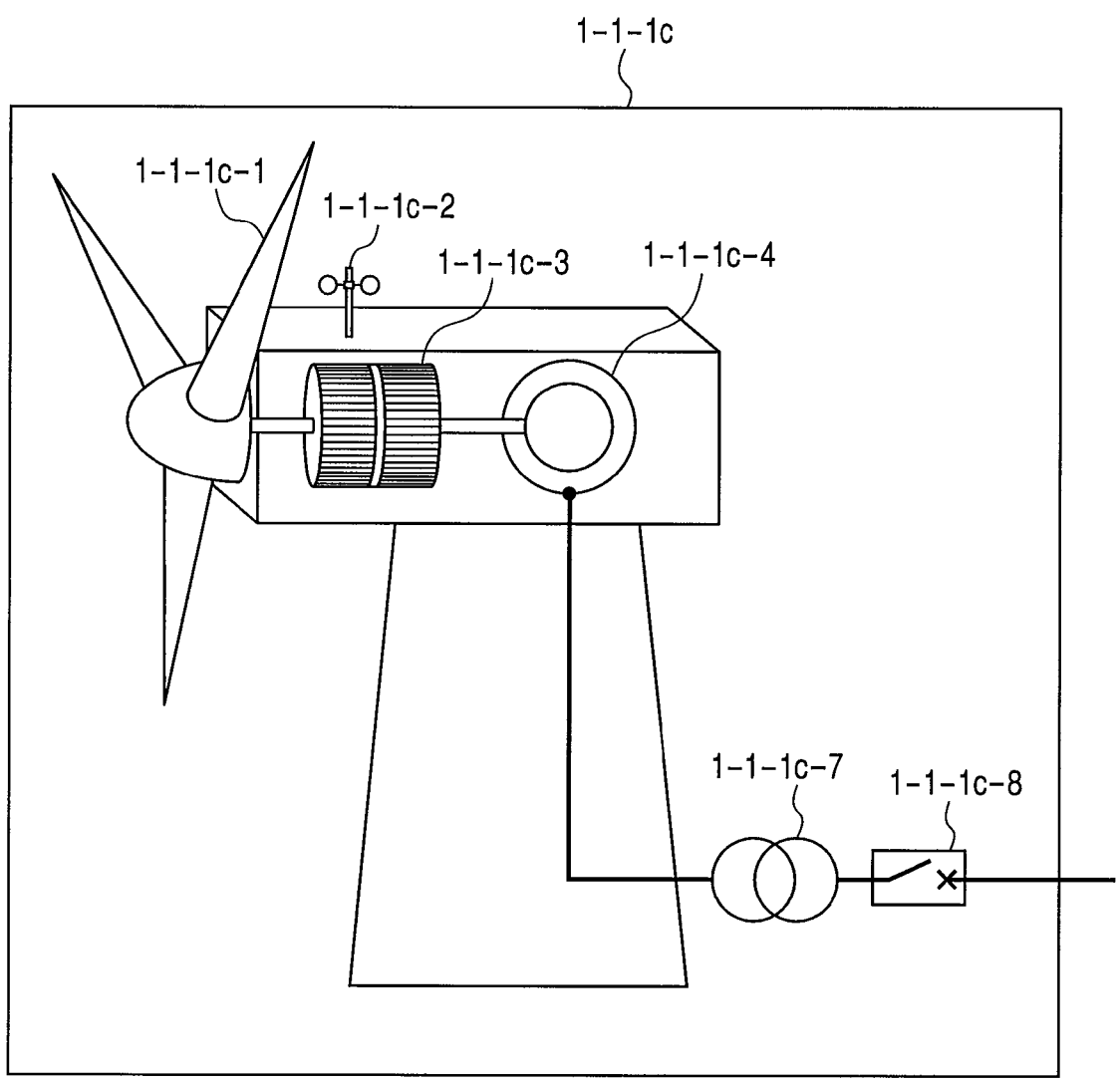
FIG. 5 is a diagram showing an example of a wind turbine generator in the first embodiment of the present invention.
Figure 6:
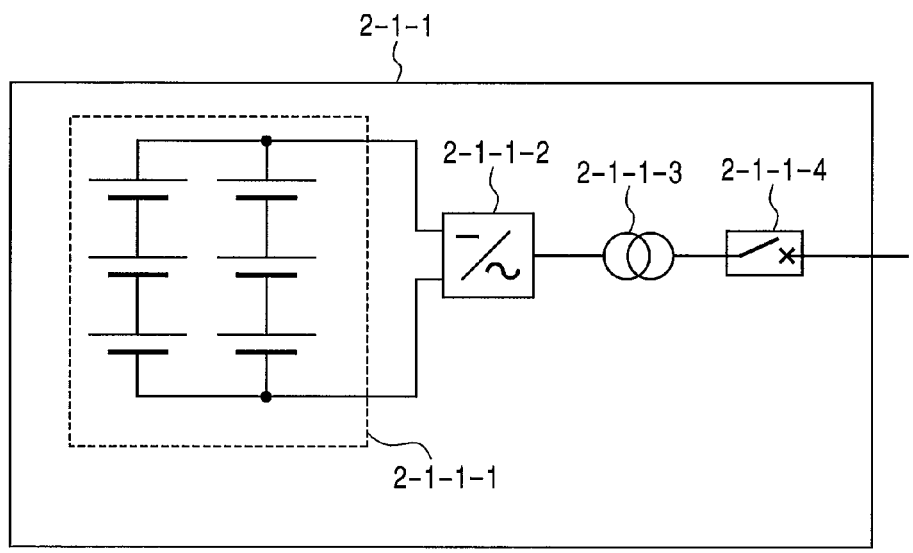
FIG. 6 is a diagram showing an example of a power storage device in the first embodiment of the present invention.

The wind turbine generators 1-1-1, 1-1-2, ... 1-1-n will be explained with reference to FIGS. 2 through 5. FIG. 2 is a diagram showing an embodiment of the wind turbine generator. The wind turbine generator catches wind with blades 1-1-1-1 and converts the wind energy to rotating energy. The rotating energy is transferred to a generator 1-1-1-4. In FIG. 2, a DC excite synchronous generator 1-1-1-4 is shown as the generator 1-1-1-4. A stator of the DC excite synchronous generator 1-1-1-4 is linked to an electric power system via an AD converter 1-1-1-5 and a DA converter 1-1-1-6. Further, a rotor of the DC excite synchronous generator 1-1-1-4 is also linked to the electric power system via an exciting device 1-1-1-9, and by adjusting the magnitude of DC exciting current through control of the exciting device 1-1-1-4, a variable speed operation of the generator is realized. FIG. 3 is an example of a wind turbine generator wherein an AC excite synchronous generator 1-1-1a-4 is used as the generator. Further, FIG. 4 is an example of a wind turbine generator wherein a permanent magnet synchronous generator 1-1-1b-4 is used as the generator. The group of wind turbine generators as shown in FIGS. 2 through 4 can be operable in variable speed through adjusting the power converters and a pitch angle of the blades. Further, the generation power of these wind turbine generators can be limited below a predetermined value through combination of the control of the pitch angle of the blades and the control of the power converters. Further, FIG. 5 is an example of a wind turbine generator wherein an induction generator 1-1-1c-4 is used as the generator. With regard to the wind turbine generator as shown in FIG. 5, the stator of the induction generator 1-1-1c-4 is directly linked to the electric power system without routing power converters. The generation power of the wind turbine generator using the induction generator 1-1-1c-4 can also be limited below a predetermined value through control of the pitch angle. The group of wind turbine generators 1 can be configured by any single kind of the wind turbine generators as shown in FIGS. 2 through 5 or by combinations thereof.

Now, the power storage system 2 constituting the wind power generation system will be explained. the power storage system 2 is constituted by more than one power storage devices 2-1-1, 2-1-2, ... 2-2-m. The individual power storage devices will be explained with reference to FIG. 6. The power storage device 2-1-1 is constituted such as by a plurality of secondary batteries 2-1-1-1, a converter 2-1-1-2, a linking transformer 2-1-1-3 and a circuit breaker 2-1-1-4. The secondary battery is any one of a lead acid battery, a sodium-sulfur battery, a redox flow battery, a lithium-ion battery, a nickel-metal hydride battery and a lithium-ion capacitor or any combinations thereof. Further, although the use of secondary batteries is exemplified as the power storage device in FIG. 6, even when capacitors such as an electric double layer capacitor and an ordinary capacitor in place of the secondary batteries, or combinations of secondary batteries and capacitors or combinations with other power storage elements are used for constituting the power storage device, the same effect of the present invention can be achieved. Further, even when a system such as a flywheel capable of accumulating an electric energy in kinetic energy is used, the effect of the present invention is not lost. The respective power storage devices 2-1-1, 2-1-2, ... 2-2-m can be charged by the generation power of the group of wind turbine generators 1 or can discharge the stored electric power in accordance with a charging or discharging power command from the superior controller 3. Further, since the respective power storage devices 2-1-1, 2-1-2, ... 2-2-m measure the charge rate SOC of their batteries, the measured values of SOC are transmitted to the superior controller 3.

In the wind power generation system in which the group of wind turbine generators 1 is provided with the power storage system 2, the large variation of generation power due to the group of wind turbine generators 1 can be mitigated through charging and discharging operation of the power storage system 2, therefore, the present system can be said as a wind power generation system which hardly affects adversely to an electric power system.

On the other hand, a charging and discharging operation of batteries is necessarily accompanied by losses such as a loss due to electric power converters and a loss inside the batteries. In order to utilize natural energy to its maximum, it is desirable to limit the amount of electric power to be charged to or discharged from the batteries as less as possible.

In order to balance the mitigation of the generation power variation and the effective utilization of natural energy, it is necessary to limit unnecessary charging and discharging operation, which does not contribute to mitigate the variation as much as possible.

The variation of the generation power output from the group of wind turbine generators occurs over a wide frequency range. Among the range, with regard to a variation of about a few minutes to 20 minutes which is called as an intermediate cycle region, it is feared that such variation leads such as to an expansion of power supply and demand unbalance due to shortage of adjustment capacity and due to an expansion of frequency variation. In order to avoid the adverse effects due to power variation in such intermediate cycle region, it is necessary to mitigate power variation in this frequency band. More specifically, it is effective to keep always an output variation of the generation power in a predetermined period (for example, within 20 minutes) beginning from any arbitrary timing within a fixed value (for example, 10% of rated value of a wind power generation system), namely within an allowable variation width of the output power. When the power variation of the wind power generation system is below about 10% of the rated value, an influence affecting to the electric power system can be limited even when many groups of wind turbine generators are linked. Herein below, a control method will be explained in which a variation of the generation power in 20 minutes beginning from any arbitrary timing is kept below 10% of the rating of a wind power generation system.

Figure 7:
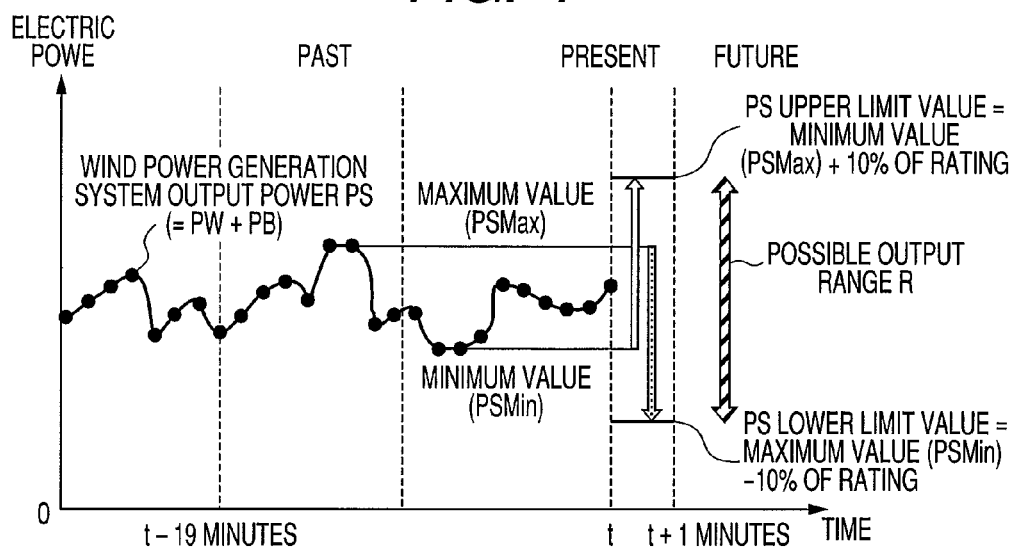
FIG. 7 is a diagram showing an output power of a wind power generation system in the first embodiment of the present invention.

In order to reduce an amount of charging and discharging power of the batteries as much as possible while suppressing the variation of the generation power in 20 minutes beginning from any arbitrary timing below 10% of the rating of a wind power generation system, it will be enough if the control as shown in FIG. 7 is realized. Namely, a possible output range R of PS in a subsequent control period (one minute in FIG. 7) is set from an output variation width of an output power of the wind power generation system in a predetermined period (19 minutes in FIG. 7) prior to the present time t. More specifically, the upper limit of the range R is set to a value obtained by adding 10% of the rating to the minimum value PSmin of PS in the predetermined period in past (19 minutes in FIG. 7) and the lower limit of the range R is set to a value obtained by subtracting 10% of the rating from the maximum value PSmax of PS in the predetermined period in past.

In the subsequent control period (one minute in FIG. 7), charging and discharging power PB of the power storage system 2 is adjusted so as to keep PS within this range. The power storage system 2 performs the charging or discharging operation only when a generation power of the group of wind turbine generators 1 deviates from the range R or when SOC of the power storage system 2 deviates from a target charge rate range. Through performing such charging and discharging control of the power storage system 2 the amount of charging and discharging power of the batteries can be reduced while suppressing always the power variation of output power PS in 20 minutes of the wind power generation system 2 below 10% of the rating.

Further, as another measure for mitigating the electric power variation of the wind power generation system, a power limiting of the group of wind turbine generators can be utilized. Namely, in a period when wind speed increases suddenly, by making use of a power limiting function of the respective wind turbine generators a possible rising of the power generation PW of the group of wind turbine generators 1 can be limited and mitigated. However, since such power limiting function is realized by letting wind energy free, which can be originally usable, through adjustment of the pitch angle, it is desirable to use the power limiting function as little as possible.

As has been explained above, as a measure of suppressing a sudden increase of the output power PS of the wind power generation system, it is desirable to use the charging of the power storage system 2 as much as possible. Although the power charged in the power storage system 2 is partly lost by the internal loss, a substantial part can be effectively used by discharging. Accordingly, in order to effectively utilize natural energy, it is necessary to store power by the charging function of the batteries as much as possible and to suppress only the power that cannot be stored through the power limiting function.

Herein below, a control method that suppresses the amount of charging to and discharging from the batteries to their minimum and another control method that does not utilize the power limiting function as much as possible by making use of the charging function of the power storage system 2 for realizing a wind power generation system, will be explained in detail.

Figure 8:
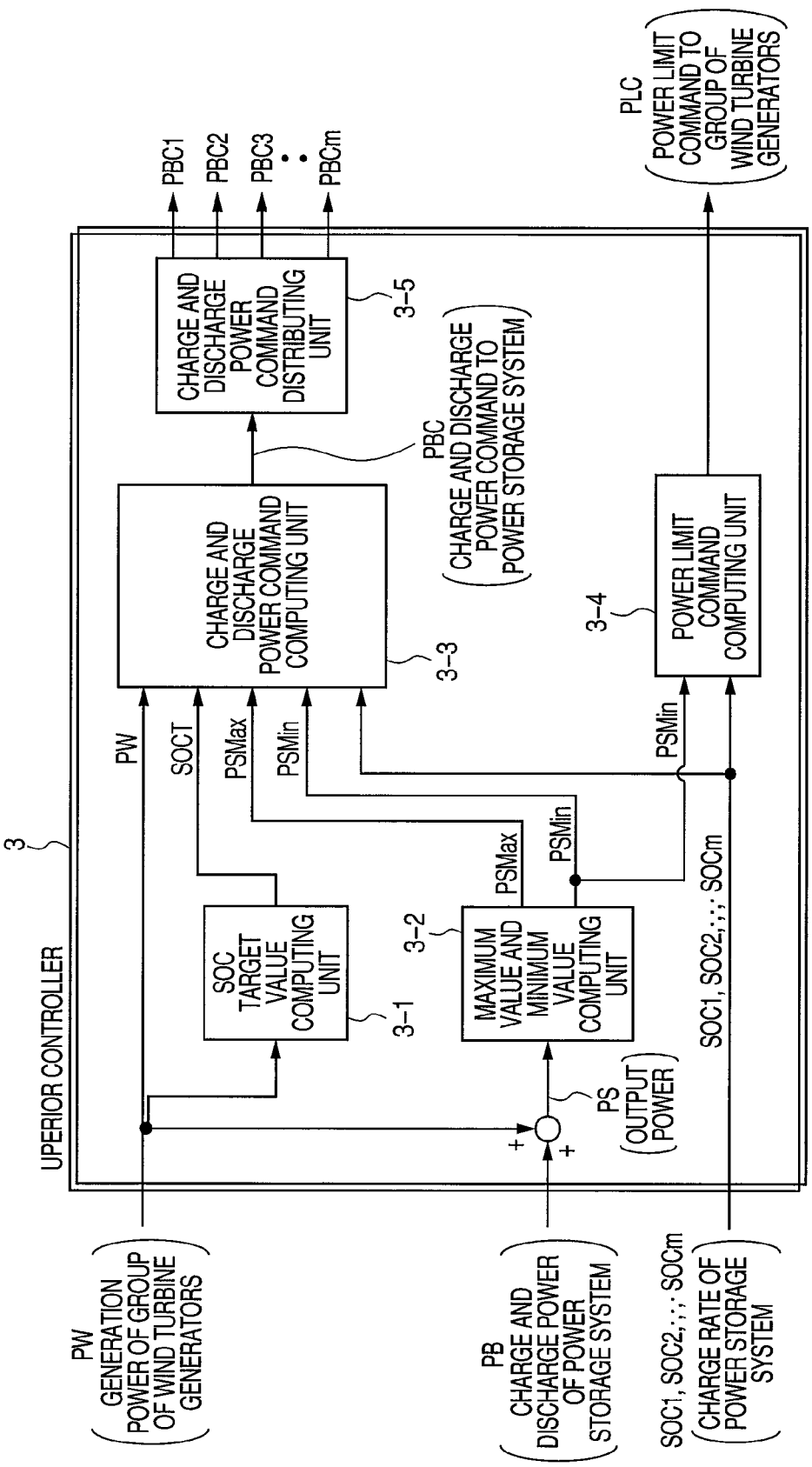
FIG. 8 is a diagram for explaining a control system in a superior controller in the first embodiment of the present invention.

FIG. 8 is a diagram showing a control structure of a superior controller 3 constituting the wind power generation system of the present invention. The superior controller 3 determines charging and discharging power commands PBC1, PBC2, ... PBCm of the power storage devices and a power limiting command PLC of the group of wind turbine generators 1 from the generation power PW of the group of wind turbine generators 1, the generation power PS of the wind turbine generators (the charging and discharging power PB of the power storage system in case that the generation power PS is calculated from the generation power PW of the wind power generation system and the charging and discharging power PB of the power storage system), the charge and discharge power PB of the power storage system 2 and the charge rates SOC11, SOC2, ... SOCm of the power storage devices. The superior controller 3 computes a charge rate target value SOCT of the power storage system 2 in a SOC target value computing unit 3-1. Further, in case that wattmeter 8 is not provided, the superior controller 3 computes an output power PS of the wind power generation system through adding PW and PB. In FIG. 8, the generation power PS of the wind turbine generators is calculated by adding the generation power PW to the charging and discharging power PB as the example. In case that the generation power PS detected by the wattmeter 8 is used, detected value of the generation power PS by the wattmeter 8 is directly inputted to the maximum value and minimum value computing unit 3-2 (Figure is omitted). In the maximum value and minimum value computing unit 3-2 is provided with the generation power recording memory for recording a generation power PS which is sum of the generation power PW and the charging and discharging power PB. As the generation power PS which is sum of the generation power PW and the charging and discharging power PB includes a generation power PS which is detected by the wattmeter 8. When the generation power PS is calculated by adding the generation power PW detected by the wattmeter 6 to the charging and discharging power PB detected by the wattmeter 7, the generation power PS is not corresponding to the generation power PS detected by the wattmeter 8 exactly under consideration of electrical loss, however, this calculated generation power PS may use as a generation power PS. The superior controller 3 reads information of the generation power PS from the generation power recording memory and computes the maximum value PSMax and the minimum value PSMin of PS in a period of 19 minutes in past in a maximum value and minimum value computing unit 3-2. Further, the superior controller 3 computes a charging and discharging power command PBC of the power storage system 2 in a charging and discharging power command computing unit 3-3. A charging and discharging power command distributing unit 3-5 distributes the charging and discharging power command PBC to the individual power storage devices 2-1-1, 2-1-2, . . . , 2-1-m as their charging and discharging power commands PBC1, PBC2, . . . PBCm and transmits the same to the individual power storage devices. Further, a relationship as expressed by the following formula 2 stands between the charging and discharging power command PBC of the power storage system 2 and the charging and discharging power commands PBC1, PBC2, . . . PBCm to the individual power storage devices.

$$PBC=PBC1+PBC2+PBC3+\ldots PBCm \quad \text{(Formula 2)}$$

The superior controller 3 computes a power limiting command PLC of the group of wind turbine generators 1 in a power limiting command computing unit 3-4.

Figure 9:
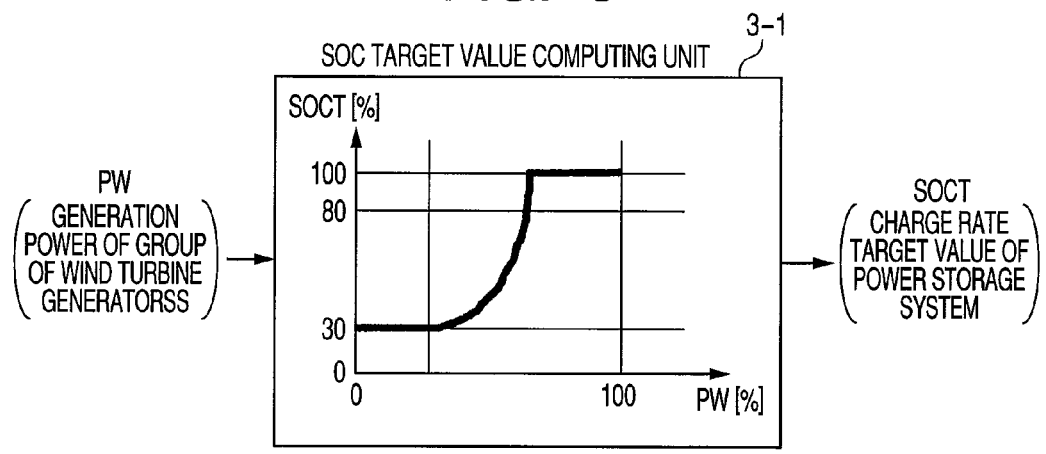
FIG. 9 is a diagram showing a charge rate target value preparing means in the first embodiment of the present invention.

Now an operation of the SOC target value computing unit 3-1 will be explained in detail with reference to FIG. 9. The SOC target value computing unit 3-1 computes a charge rate target value SOCT of the power storage system 2 from the generation power PW of the group of wind turbine generators 1. The unit stores inside thereof charge rate target values of the power storage system 2 in which PW and SOCT correspond one to one relationship as shown in FIG. 9, and determines SOCT with reference to the internal values. Further, the manner of determining SOCT does not necessarily need to depend on PW as seen from FIG. 9 and even when SOCT is, for example, a constant value not depending on PW, the effect of the present invention is not lost.

Figure 10:
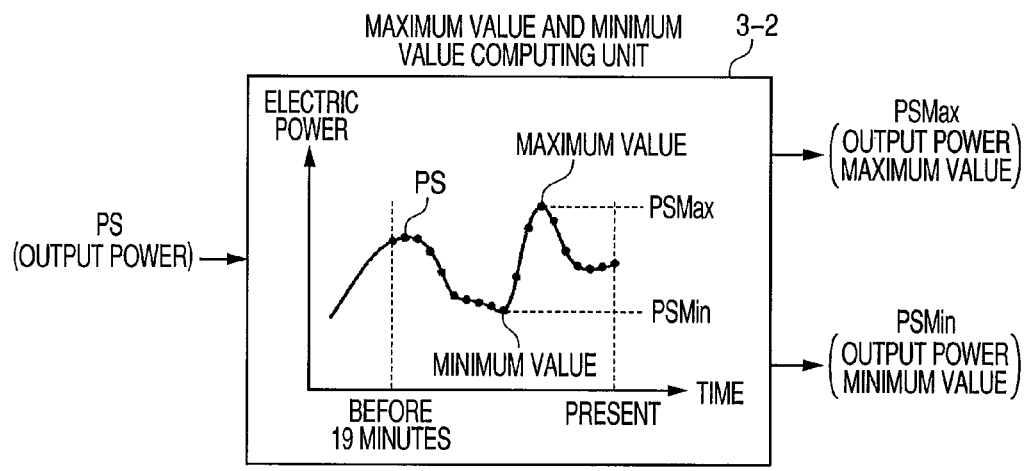
FIG. 10 is a diagram showing a maximum value and minimum value computing means in the first embodiment of the present invention.

Now an operation of the maximum value and minimum value computing unit 3-2 will be explained in detail with reference to FIG. 10. The maximum value and minimum value computing unit 3-2 stores PS in a predetermined period in past from the present time in an internal memory. Further, the maximum value and minimum value computing unit 3-2 computes the maximum value PSMax and the minimum value PSMin of PS in the predetermined period in past from the present time.

Figure 11:
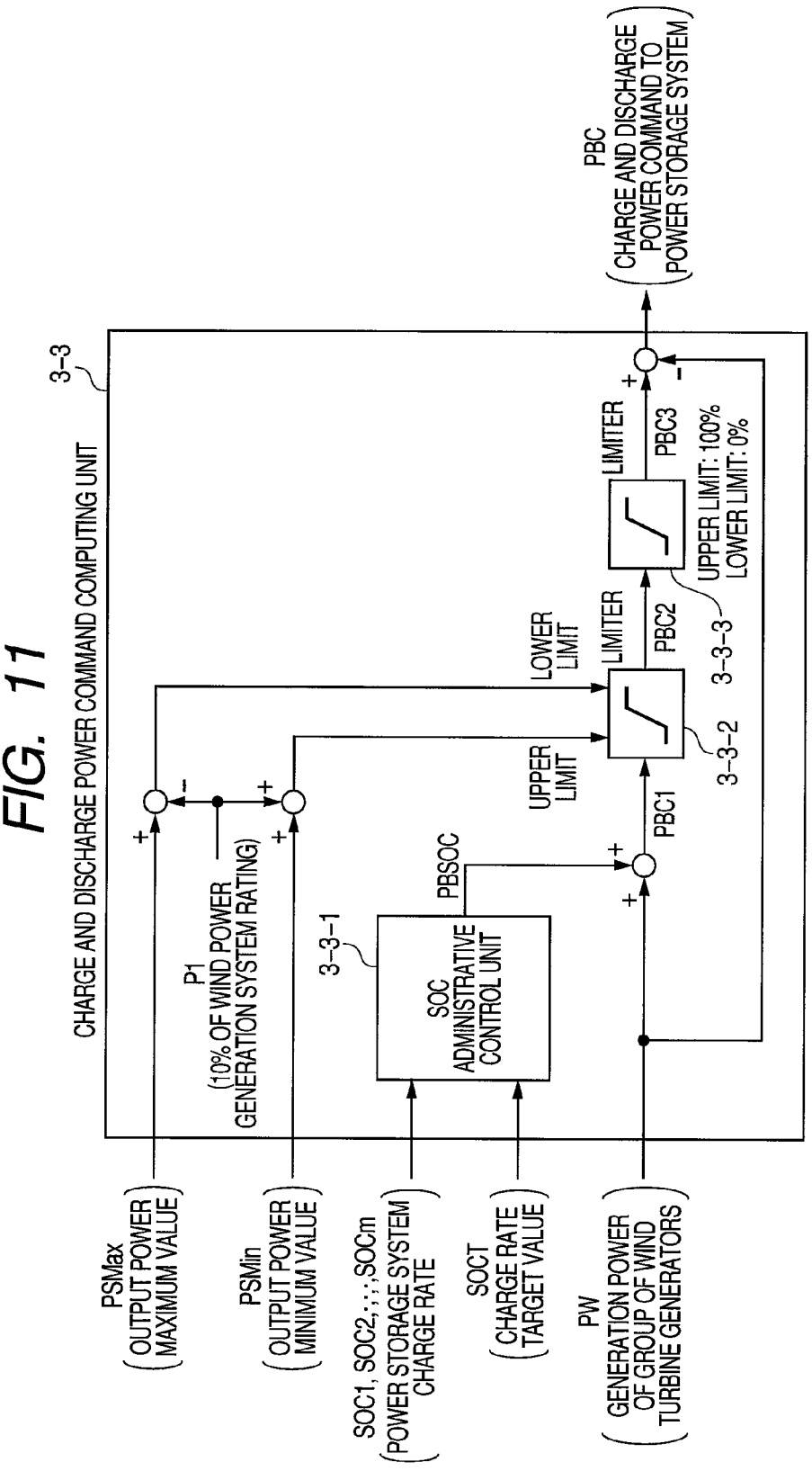
FIG. 11 is a diagram showing a charging and discharging power command preparing means in the first embodiment of the present invention.

Now an operation of the charging and discharging power command computing unit 3-3 will be explained in detail with reference to FIG. 11. The charging and discharging power command computing unit 3-3 prepares an intermediate value PBSOC of the charging and discharging power command for an SOC administration in an SOC administration and control unit 3-3-1. The charging and discharging power command computing unit 3-3 prepares a value PBC1 that is obtained by adding PW to PBSOC and determines an intermediate value PBC3 of the charging and discharging power command by subjecting the prepared value to limiters 3-3-2 and 3-3-3. The charging and discharging power command computing unit 3-3 determines a charging and discharging power command PBC by subtracting PW from the intermediate value PBC3. The first limiter 3-3-2 sets an upper limit value as a value obtained by adding 10% of the wind power generation system rating to PSMin and a lower limit value as a value obtained by subtracting 10% of the wind power generation system rating from PSMax. Due to the effect of the limiter 3-3-2, a variation of the output power PS of the wind power generation system can be suppressed within 10% of the rating in any 20 minutes period. Further, when the generation power PW of the group of wind turbine generators 1 stays in the range of the limiter, the power storage system does not perform charging and discharging to avoid unnecessary charging and discharging. The second limiter 3-3-3 sets an upper limit value as 100% of the wind power generation system rating and a lower limit value as 0% of the rating. Due to the effect of the limiter 3-3-3, such operations are prevented that the output power PS of the wind power generation system exceeds the rating thereof or PS assumes a negative value to render the wind power generation system in a condition to be charged.

Figure 12:
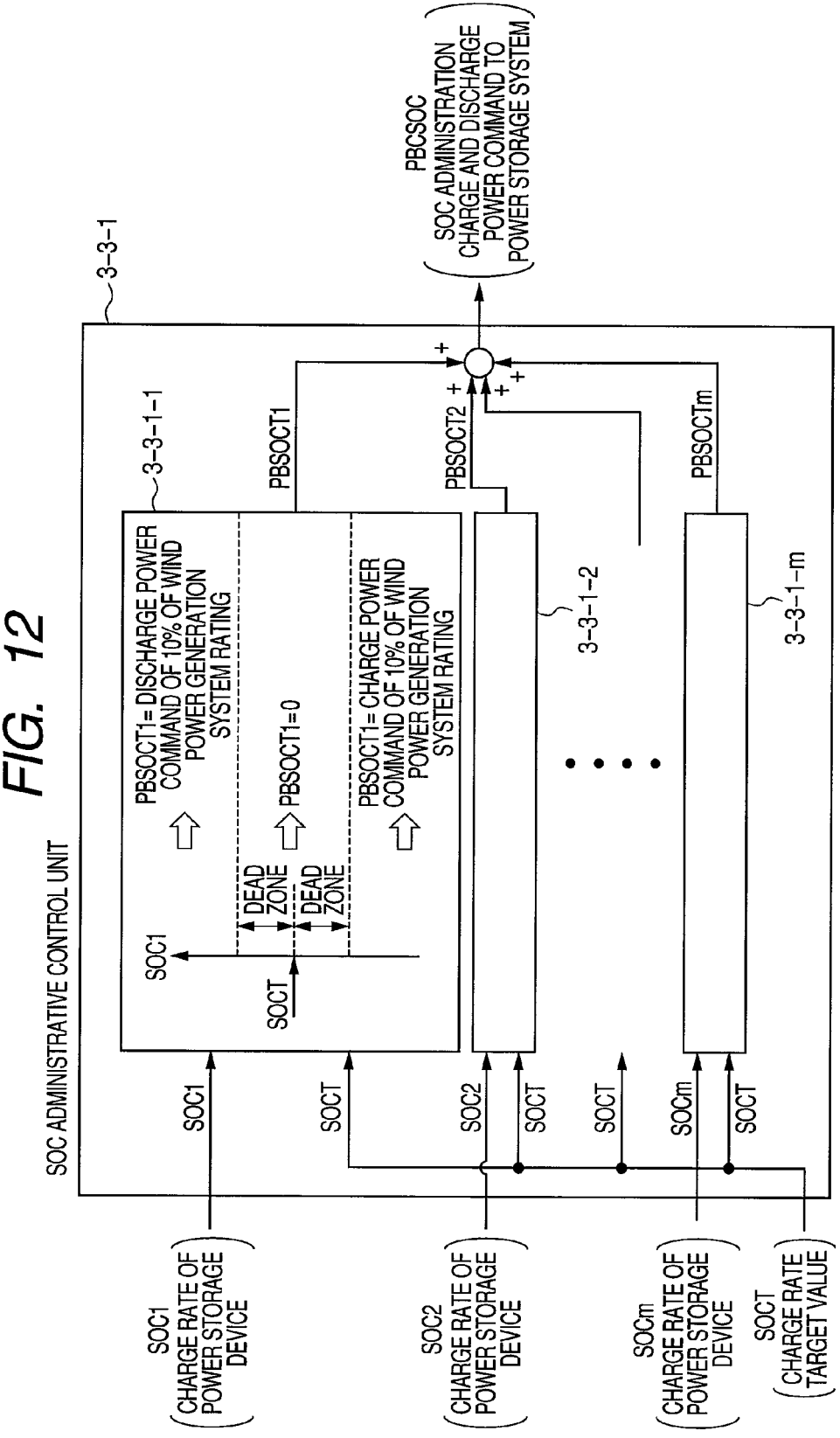
FIG. 12 is a diagram showing a charge rate administering means in the first embodiment of the present invention.

Now an operation of the SOC administration and control unit 3-3-1 will be explained in detail with reference to FIG. 12. The SOC administration and control unit 3-3-1 prepares the charging and discharging power command so as to come close the charge rates of the respective power storage devices 2-1-1, 2-1-2, . . . 2-1-m to the target charge rates. Specifically, as shown in a SOC administrative control unit 3-3-1, a charge rate measured value SOC1 of the power storage device is compared with the charge rate target value SOCT. In this instance, when the SOC1 is larger than SOCT+a dead zone (for example 2% of the rating), a discharge power command of 10% of the wind power generation system rating is prepared as a charge and discharge power command PBSOCT1. Likewise, when SOC1 is smaller than SOCT−a dead zone (for example, 2% of the rating), a charge power command of 10% of the wind power generation system rating is prepared as a charge and discharge power command PBSOCT1. When the SOC1 stays within a SOCT±a dead zone, 0 [kW] is prepared as the PBSOCT1. The SOC administration and control unit 3-3-1 performs the above computation for all of the power storage devices 2-1-1, 2-1-2, . . . 2-1-m and prepares a charge and discharge power command PBCSOC of the power storage system 2 by adding the obtained charge and discharge power commands PBSOCT1, PBSOCT2, . . . PBSOCTm. Through performing such control operation, unnecessary charge and discharge of the batteries can be prevented.

Figure 13:
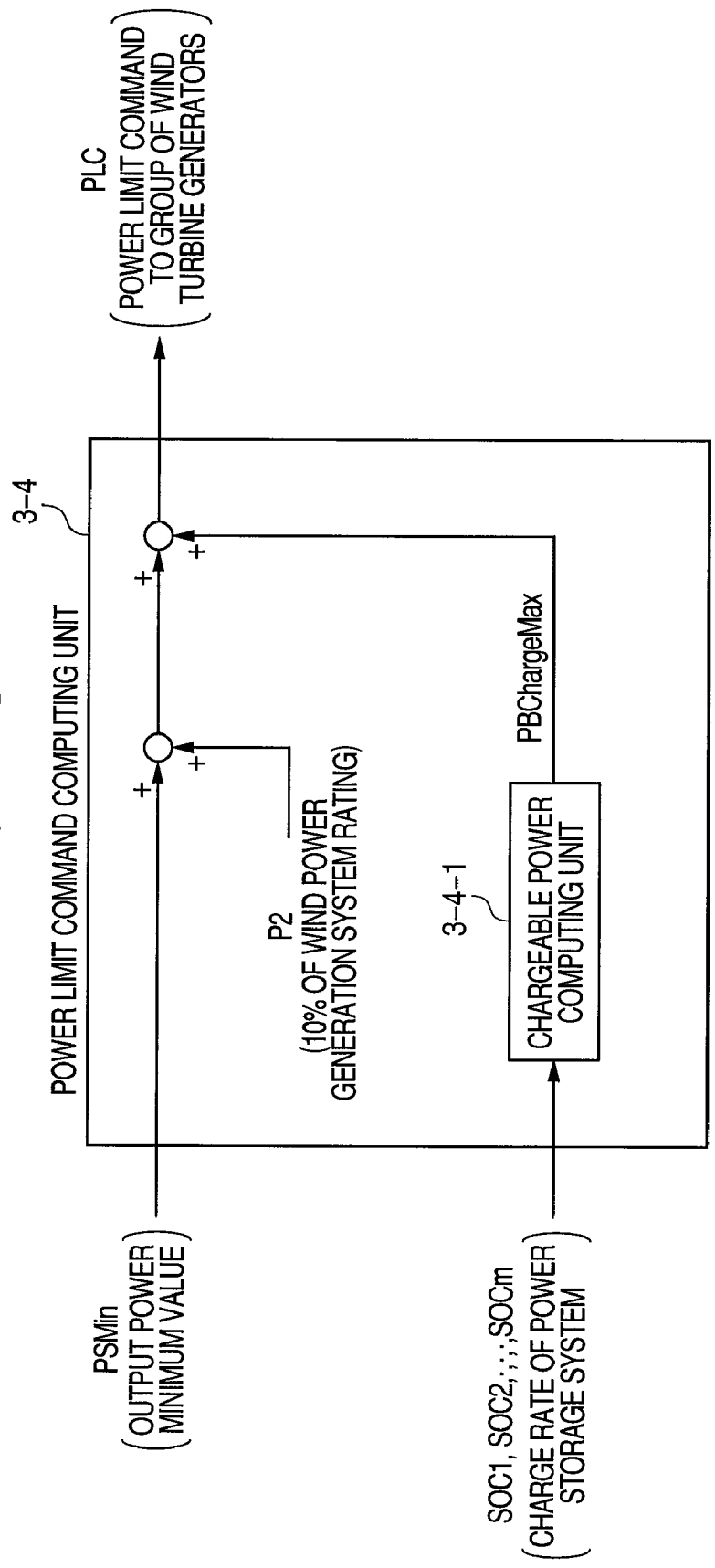
FIG. 13 is a diagram showing a power limiting command preparing means in the first embodiment of the present invention.

Now, an operation of the power limiting command computing unit 3-4 will be explained with reference to FIG. 13. The power limiting command computing unit 3-4 computes a chargeable power value PBCargeMax of the power storage system from the charge rate SOC of the power storage system 2 in a chargeable power computing unit 3-4-1. The power limiting command computing unit 3-4 determines a value obtained by adding the minimum value of the output power PSMin of the wind power generation system in the 19 minutes period in past, PBCargeMax and P2 (for example, 10% of the wind power generation system rating, which is set in relation with an allowable variation width of the output power) as a power limiting command PLC of the group of wind turbine generators 1. Through determining the PLC in the above manner, even when a generation power PS of the group of wind turbine generators 1 increases suddenly, the batteries are charged as much as possible and only the power that cannot be charged is suppressed by the power limiting function. At the same time, a variation of the output power PS of the wind power generation system can be suppressed within 10% of the rating in any 20 minutes period.

Figure 14:
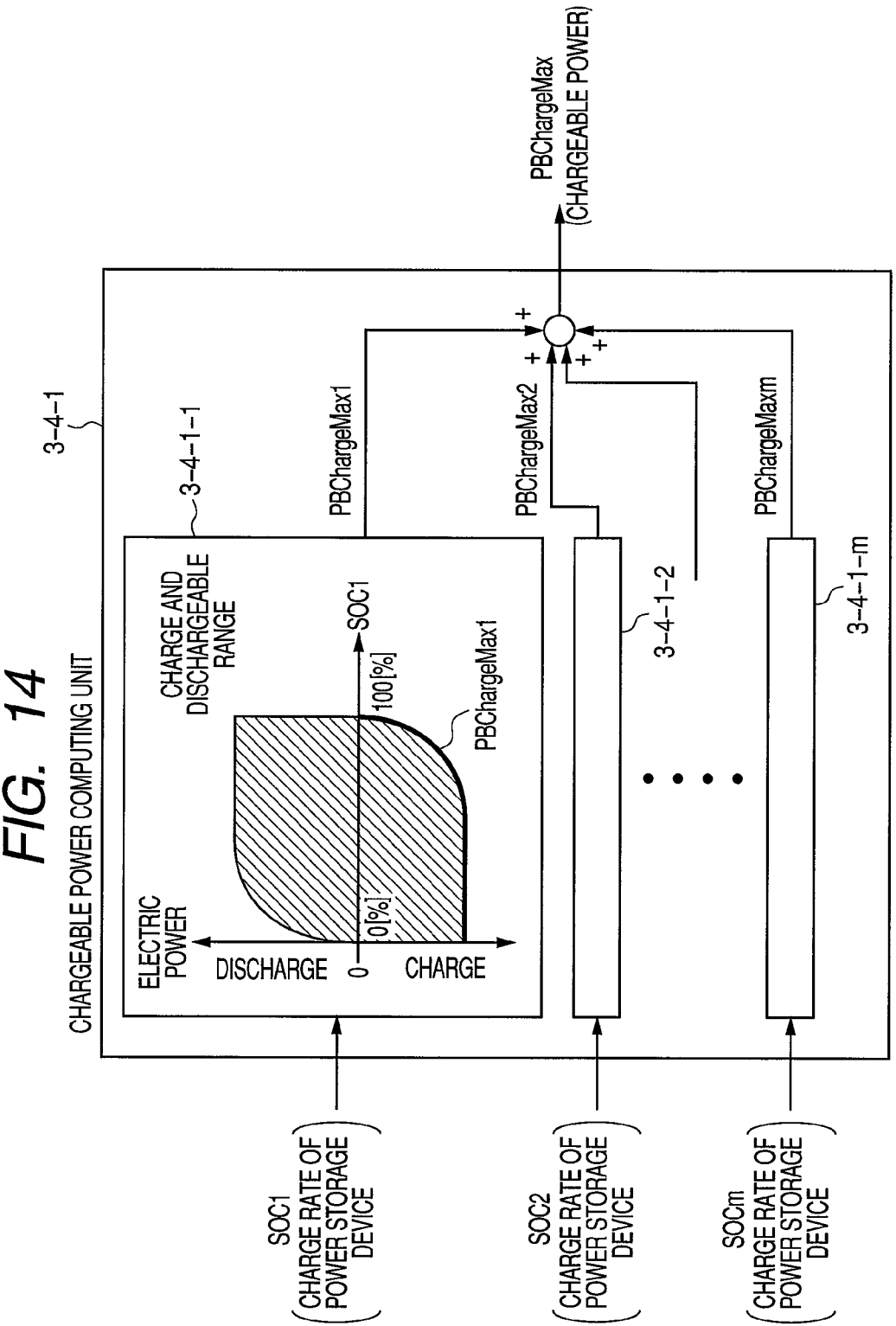
FIG. 14 is a diagram showing a possible charging power computing means in the first embodiment of the present invention.

Now, an operation of the charge and dischargeable power computing unit 3-4-1 will be explained with reference to FIG. 14. The charge and dischargeable power computing unit 3-4-1 computes a possible chargeable power value PBCargeMax of the power storage system 2 from the chargeable power values of the respective power storage devices 2-1-1, 2-1-2, . . . 2-1-m. Specifically, a chargeable power PBCargeMax1 of the power storage device 2-1-1 is computed from the charge rate measured value SOC1 of the power storage device 2-1-1 in a chargeable power computing unit 3-4-1-1. A charge and dischargeable power range of the power storage devices 2-1-1, 2-1-2, . . . , 2-1-m such as secondary batteries varies depending on its SOC. Since chargeable power computing unit 3-4-1-1 holds in a memory a charge and dischargeable region in response to the characteristics of the power storage devices 2-1-2, 2-1-2, . . . 2-1-m and reads out from the memory the corresponding chargeable power PBCCargeMax1 in response to the charge rate measured value SOC1.

The chargeable power computing unit 3-4-1 performs the above computation for all of the power storage devices 2-1-1, 2-1-2, . . . 2-1-m and prepares a chargeable power PBCharge-Max of the power storage system 2 by adding the obtained chargeable powers PBChargeMax1, PBChargeMax2, . . . PBChargemaxm. Further, although the PBChargeMax is determined only by the charge rate SOC of the power storage devices in FIG. 14 embodiment, the PBChargeMax can be corrected in view of such as temperature and years of service of the power storage devices and the amount of total charge and discharge power thereof.

Figure 15:
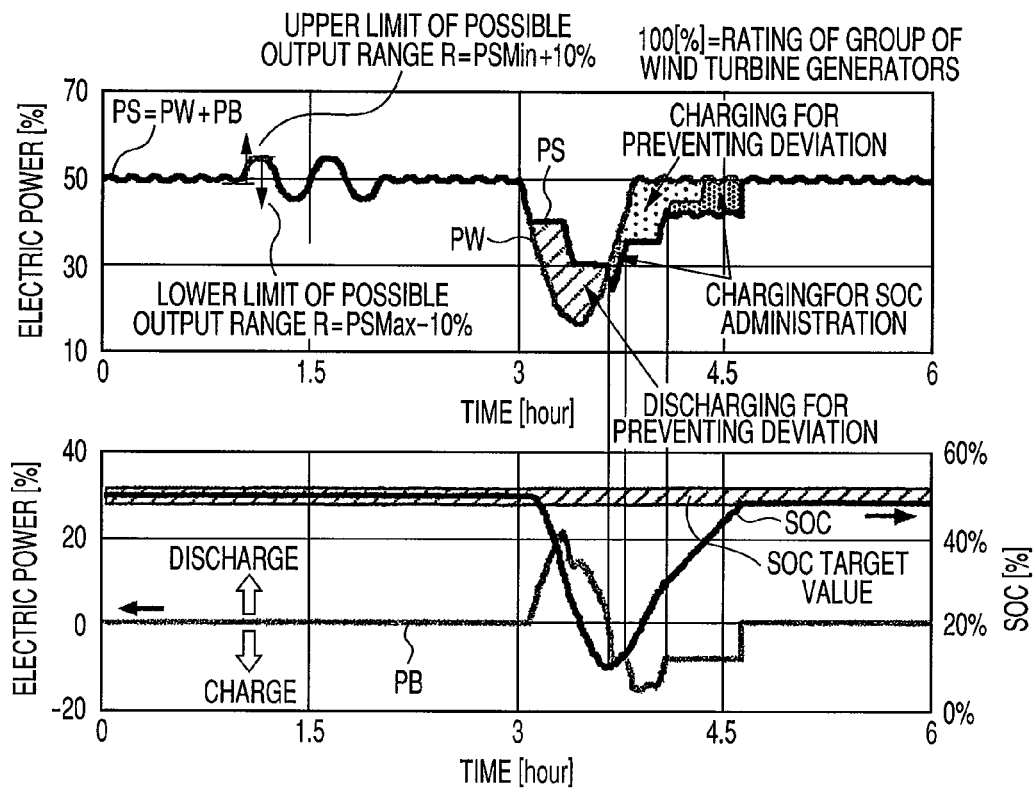
FIG. 15 is a diagram showing an example of operations of the wind power generation system in the first embodiment of the present invention.

Now, an example of operations of the wind power generation system of the present invention will be explained herein below. FIG. 15 is a result of power variation mitigating operation by the power storage system 2 of the present invention obtained through a simulation. Graphs in an upper stage of FIG. 15 show a generation power PW of a group of wind turbine generators 1, an output power PS of a wind power generation system and a possible output range R of PS. In FIG. 15, the possible output range R is set in a manner that the variation in 20 minutes period stays below 10% of the wind power generation system rating and when the variation remains in this range, the output power variation of the wind power generation system is suppressed below 10% of the rating in the 20 minutes period beginning from any timing. The output power PS of the wind power generation system as shown in FIG. 15 is always maintained in the possible output range R and the output power variation below 10% rating in 20 minutes period is realized. Graphs in a lower stage of FIG. 15 show a charge and discharge power PB of the power storage system 2 and a charge rate SOC. Further, in the simulation as shown in FIG. 15, a range of charge rate target value of the power storage system 2 is set at (50%±2%=48%~52%). At time prior to time 3 {hour} in FIG. 15, since the variation width in 20 minutes period is below 10% of the rating as well as the SOC is maintained within the target charge rate range, a charging and discharging of the power storage system 2 is not performed. Accordingly, the task of the present invention is achieved in which charging and discharging of the batteries is restricted as much as possible. Further, before and after the time 4.5 {hour}, although the generation power PW of the group of wind turbine generators 1 is maintained within the possible output range R, the batteries are performing a charging operation. This operation is for maintaining the target charge rate SOC of the power storage system 2 within the target charge rate range, and with this charging operation, the SOC is maintained within the target charge rate range. Further, at the time of charging operation for this SOC administration, the variation width of PS in 20 minutes period is also controlled to stay within 10% of the rating.

Figure 16:
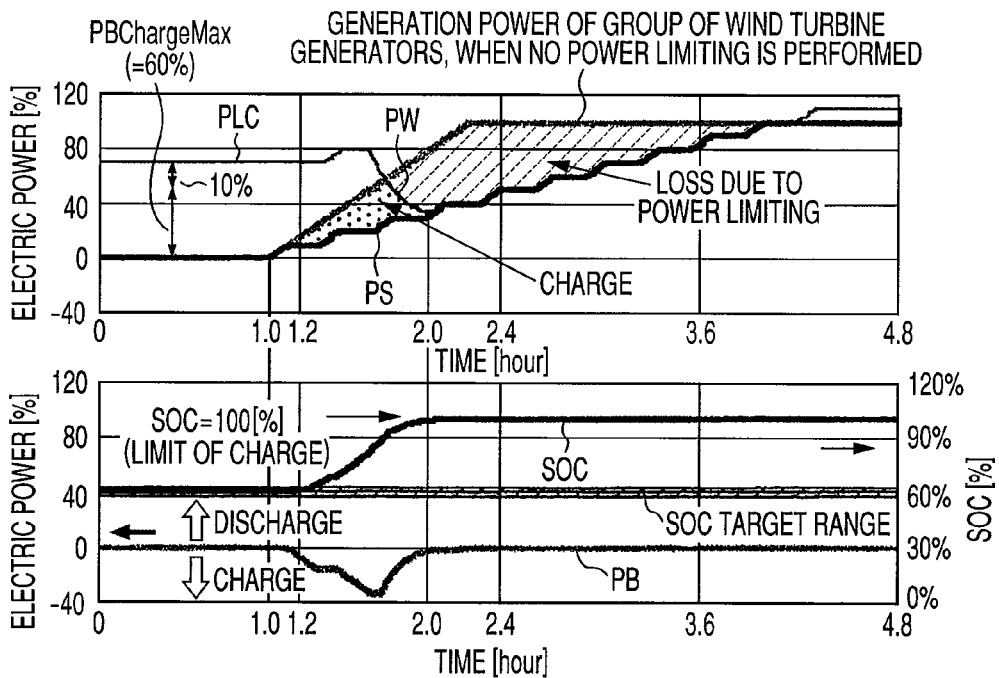
FIG. 16 is a diagram showing an example of operations of the wind power generation system in the first embodiment of the present invention.

An example of operations of the wind power generation system by the power limiting control of the present invention will be explained with reference to FIG. 16. FIG. 16 is a result of power variation mitigating operation by the power limiting control of the present invention obtained through a simulation. Graphs in an upper stage of FIG. 16 show a generation power PW of a group of wind turbine generators 1, an output power PS of a wind power generation system, a power limiting command PLC of the group of wind turbine generators 1 and a generation power PW0 of the group of wind turbine generators 1 when a power limiting control is not performed. The generation power of the group of wind turbine generators 1 begins to rise around time 1.0 {hour} and immediately after the rising the variation width in 20 minutes period is suppressed within 10% of the rating by the charging operation of the power storage system 2. Around time 2.0 {hour}, a charge rate of the power storage system reaches 100%. Since the charging operation cannot be performed, when the charge rate of the power storage system 2 is more than 100%, the generation power PW is suppressed by the power limiting function of the group of wind turbine generators 1 at the time 2.0 [hour]. Through the power limiting function depending on SOC of the power storage system 2, in that by performing the charging operation of the power storage system 2 with priority, the task of the present invention of effectively utilizing natural energy can be fulfilled while restricting the use of the power limiting function as much as possible.

Now, effects of the present invention will be explained with reference to FIG. 17. FIG. 17 shows effects obtained by simulation when the present invention is applied to an actually existing wind power generating system. Specifically, FIG. 17 is a result obtained by a numerical simulation on the operation when assuming that a power storage system is provided with based on generation power output data of about one year of an actually existing wind power generation system not provided with a power storage system. In the simulation, an MW capacity of the power storage system is assumed as 90% of the rated capacity of the wind power generation system and the MWh capacity as infinite. Namely, the power storage system is in a steady condition capable of discharging and charging 90% of the rated capacity. In the simulation, for the purpose of comparison, other than the battery control, a prior art control method in which the charging and discharging of the batteries is performed so that the output power PS of the wind power generation system follows with a first order delay of the generation power PW of the group of wind turbine generators as well as another prior art control method in which the charging and discharging of the batteries is performed only when the PS deviates from a first order delay follow-up+a fixed width of the PW, are evaluated.

FIG. 17 is a summary of the simulation result and shows deviation rate, total amount of charge power of the batteries, total amount of discharge power and loss due to battery charging and discharging. Further, the deviation rate is an occurrence rate of an event when the output power PS of the wind power generation system varies exceeding over the 10% rating in 20 minutes period beginning from any arbitrary timing. Further, the loss is a value determined from the total amount of discharge power of the batteries while assuming the charging and discharging efficiency of the batteries is constant at 70%. In the controls of first order delay follow-up and of first order delay follow-up+a fixed width, there are cases which achieve a deviation rate 0.0[%] when the time constant of first order delay is more than 180 minutes. Among the cases that achieve the deviation rate 0.0[%] a loss of 5.8[%] is caused even a case where the charging and discharging loss is minimum. On the other hand, when the present invention is practiced, the deviation rate is 0.0[%] as well as the loss is very limited to as 2.1[%]. Accordingly, it is confirmed that the tasks of the present invention of reducing the amount of charging and discharging power of the power storage system and to decreasing the loss due to charging and discharging of the power storage system are fulfilled.

Further, the structure of the wind power generation system of the present invention is not limited to that of FIG. 1, in that even when the superior controller 3 combines the function of the control device of the power storage system, the effect of the present invention is the same. Likewise, even when the superior controller 3 combines the function of the SCADA 1-1 of the group of wind turbine generators 1, the effect of the present invention is not lost. Further, even with a configuration in which the superior controller 3 directly provides the power limiting command to the individual wind power generation devices 1-1-1, 1-1-2, . . . 1-1-n with no provision of the SCADA 1-1 of the group of wind turbine generators, the effect of the present invention is not lost.

Further, in the wind turbine generators of the present invention, all of the windmills do not necessarily possesses the power limiting function, and instead of the power limiting function, if a configuration having a function that limits the generation power of the group of wind turbine generators as a whole to below a predetermined value by changing over the conditions between operation and stand still of the individual windmills is provided, the present invention can be realized.

Further, in the present embodiment, although the objective power variation for the mitigation is limited to a frequency band of about a few minutes~20 minutes, since the frequency band in which power variation is to be mitigated is different for every electric power system, through changing the control constants depending on an electric power system, the effect of the present invention can be likely realized.

In the present embodiment, during when the generation power PW remains within the possible output range R as well as the charge rate SOC remains in the range of target charge rate, a charging and discharging is not performed by the power storage system 2. During when no charging and discharging is performed by the power storage system 2, an auxiliary power source for the converter 2-1-1-2 constituting the power storage system 2 can be stopped. Specifically, operation of cooling fans, supply to a power source for control and switching operation of semiconductors constituting the converter 2-1-1-2 are stopped. Due to the stoppage of the auxiliary power source, a normally generated loss by the power storage system 2 can be reduced and the natural energy can be further effectively utilized.

As has been explained hitherto, through the use of the present invention, a loss due to charging and discharging of the power storage system 2 can be reduced while suppressing the output variation of the wind power generation system. Further, through the use of the present invention, a loss due to the power limiting can be reduced. Further, due to the effect of the present invention, since the amount of charging and discharging power of the power storage system 2 can be reduced, the capacity of the batteries required for the power storage system 2 can be reduced, the wind power generation system provided with the power storage system that is the configuration of the present invention is easily introduced. Further, due to the effect of the present invention, since the amount of charging and discharging power of the power storage system 2 can be reduced, the lifetime of the power storage devices can be prolonged. Accordingly, through the use of the present invention, the natural energy can be utilized effectively in comparison with the conventional art.

[Embodiment 2]

A second embodiment of the present invention will be explained with reference to FIGS. 18 through 20.

Differences of the present embodiment from embodiment 1 of the present invention are that the wind power generation system includes a predetermined output power upper limit command PMaxC, and the power limiting operation of the group of wind turbine generators and charging and discharging operation of the power storage system are performed in combination so that the output value of the wind power generation system is always below the output power upper limit command PMaxC. Parts different from the configuration of embodiment 1 of the present invention will be explained with reference to FIGS. 18 and 19.

A charging and discharging command computing unit 3a-3 in the present embodiment will be explained with reference to FIG. 18. Different part of the charging and discharging command computing unit 3a-3 of the present embodiment from the charging and discharging command computing unit 3-3 of embodiment 1 is to select the upper limit value of a limiter 3a-3-3 not from the rating of the wind power generation system but from the output power upper limit command PMaxC (in the present embodiment, 70% of the rating) representing a value below the rating of the wind power generation system. Since the other parts of the charging and discharging command computing unit 3a-3 of the present embodiment are the same as the charging and discharging command computing unit 3-3 of embodiment 1, their explanation is omitted.

A power limiting command computing unit 3a-4 in the present embodiment will be explained with reference to FIG. 19. Different part of the power limiting command computing unit 3a-4 of the present embodiment from the power limiting command computing unit 3-4 of embodiment 1 is that a minimum value selection computing unit 3a-4-2 is newly added. The minimum value selection computing unit 3a-4-2 compares (PSMin+10% of the rating) with PMaxC and selects the smaller one. Since the other parts of the power limiting command computing unit 3a-4 of the present embodiment are the same as the charging and discharging command computing unit 3-4 of embodiment 1, their explanation is omitted.

Figure 19:
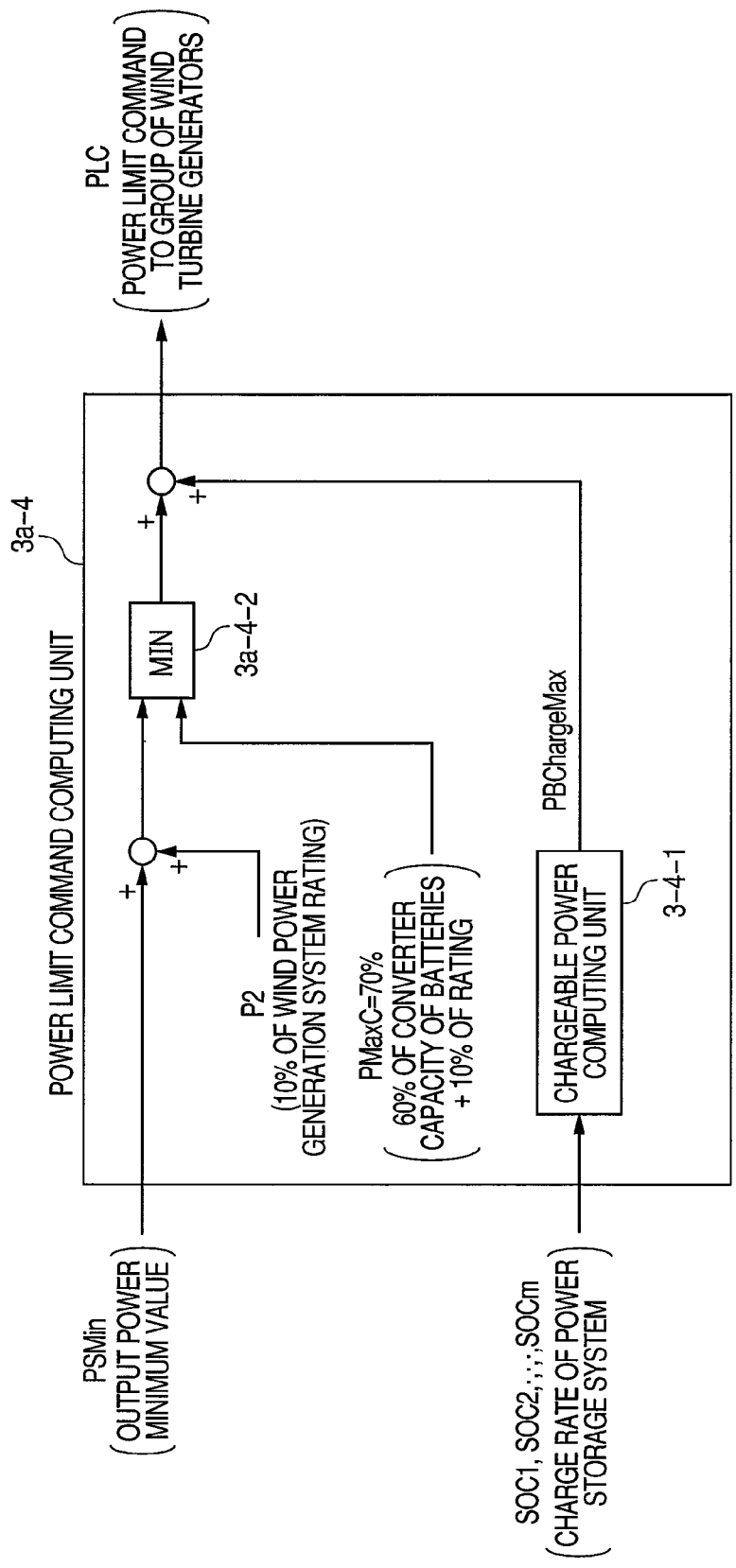
FIG. 19 is a diagram showing a power limiting command preparing means in the second embodiment of the present invention.

Through employing the control configurations as shown in FIGS. 18 and 19, with the wind power generation system of the embodiment 2, its output power is always suppressed below PMaxC.

A control operation and effect by the configuration according to embodiment 2 of the present invention will be explained with reference to FIG. 20. In a group of wind turbine generators provided with a power storage system, a ratio of a cost of the power storage system in a total cost of the wind power generation system is generally high. There is a concern that the high cost of the power storage system 2 is preventing an introduction of the group of wind turbine generators of the type provided with the power storage system 2.

In order to easily introduce the group of wind turbine generators of the type provided with the power storage system, it is desirable to reduce the capacity of the power storage system 2 as much as possible. However, when the capacity of the power storage system is reduced, a variation of the output power PS of the wind power generation system tends to expand. FIG. 20 shows an example of operations, for example, when the rated charge and discharge power value (maximum charge and discharge power value) of the power storage system is set at 60% of the wind power generation system rated value. Further, the rated charge and discharge power value of the power storage system is generally equal to the converter capacity in the power storage system.

Figure 20A:
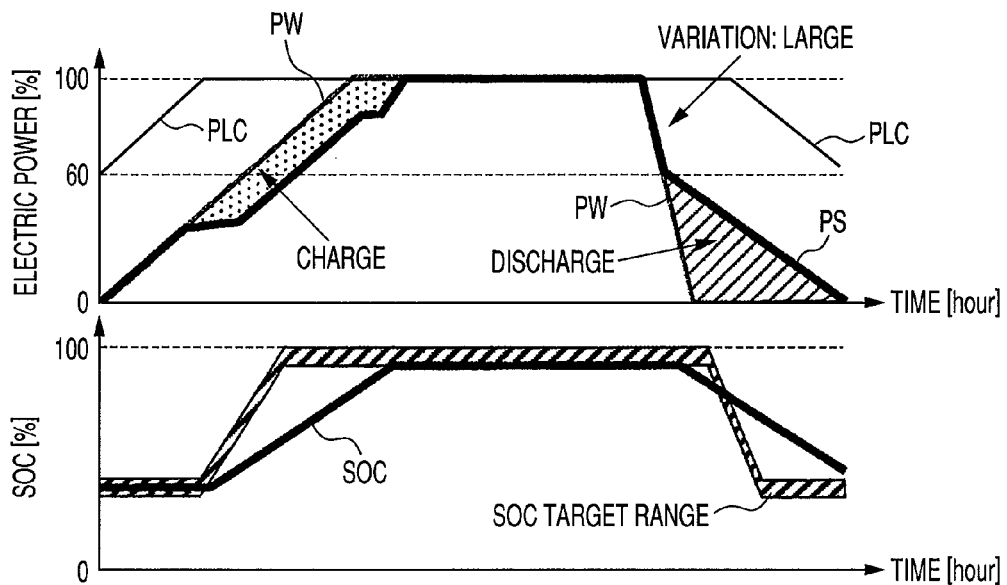
FIG. 20 (a) is a diagram showing an example of operations of the wind power generation system when an upper output limit of the system is not set in the second embodiment of the present invention.
Figure 20B:
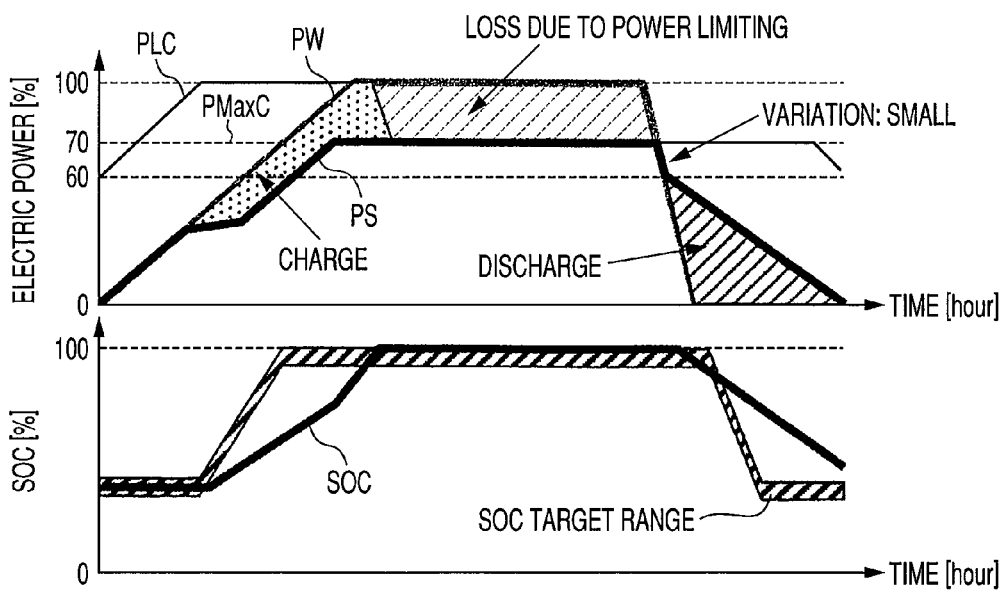

In FIG. 20 (*a*) and FIG. 20 (*b*), a condition is presumed that a wind speed around the wind power generation system gradually increases and thereafter decreases suddenly with regard to time. FIG. 20 (*a*) is a diagram showing a temporal variation of electric power and a charge rate SOC when the electric power is controlled according to the method as explained in embodiment 1. The generation power PW of the group of wind turbine generators 1 increases gradually in response to the wind speed and thereafter decreases suddenly with regard to time. During the increase of the generation power PW, the variation rate can be suppressed below a fixed value (in the present embodiment, the variation width of PS in 20 minutes period is less than 10% of the rating) by the charging operation by the power storage system 2 and the power limiting operation of the group of wind turbine generators 1. However, at the time of the sudden decrease of the windmill output PW, although it is necessary to mitigate the variation of PS by the discharging operation of the power storage system 2, but since the rated capacity of the power storage system 2 is set only at 60% of the rating of the wind power generation system, the variation rate of PS cannot be suppressed to below the fixed value and a large variation is caused.

FIG. 20 (b) is a diagram showing a temporal variation of electric power and a charge rate SOC when the control operation is performed according to the present embodiment. In the present embodiment, the output power upper limiting command PMaxC of the wind power generation system is set at the rated power value of the power storage system (60%)+10% of the rating. The output power PS of the wind power generation system is always suppressed to below PMaxC by the power limiting operation of the group of wind turbine generators 1 and by the charging operation by the power storage system 2. With this measure, even when the wind speed suddenly decreases and the generation power PW of the group of wind turbine generators 1 suddenly decreases, the maximum variation width can be suppressed to below 10% (=PMaxC−rated value of the power storage system). Thereby, the output power variation of the wind power generation system can be suppressed to below the fixed value (in the present embodiment, the variation width of PS in 20 minutes period is less than 10% of the rating).

As shown in the present embodiment, by maintaining always the output power Ps of the wind power generation system to below a predetermined value by the power limiting function of the group of wind turbine generators 1 and by the charging function of the power storage system 2, the variation rate can be suppressed to below the fixed value even when the rated capacity of the power storage system 2 is smaller than the rated capacity of the group of wind turbine generators 1. Due to this effect, the capacity of the power storage system 2 can be decreased, the wind power generation system of the type provided with batteries can be easily introduced and the natural energy can be effectively utilized.

[Embodiment 3]

A third embodiment of the present invention will be explained with reference to FIGS. 21 through 27.

Differences of the present embodiment from embodiments 1 and 2 are that the wind power generation system utilizes a generation power prediction value of the group of wind turbine generators 1 based on weather forecast for the power limiting control of the group of wind turbine generators 1 and for the charging and discharging control of the power storage system 2.

Figure 21:
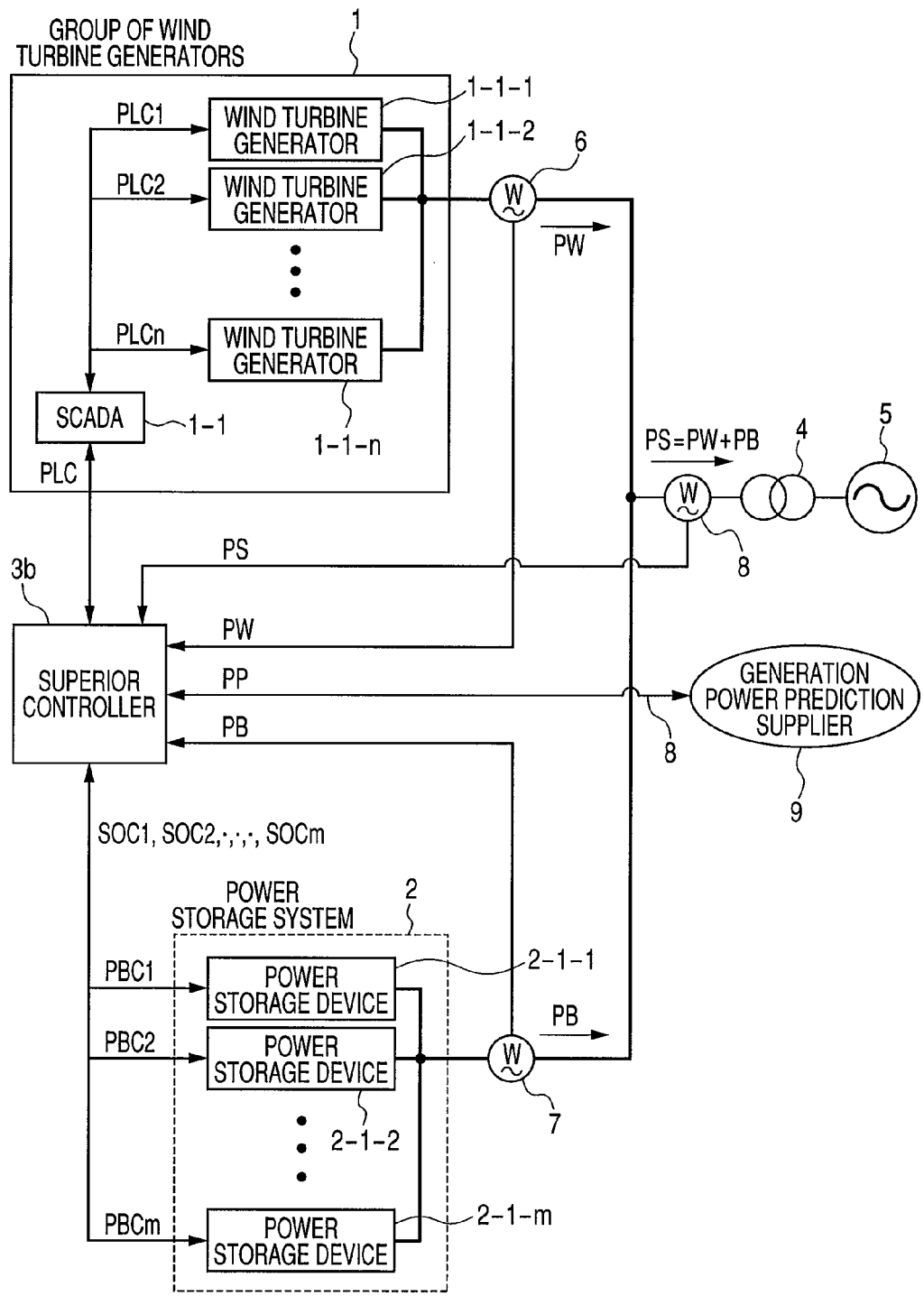
FIG. 21 is a diagram showing configuration of a wind power generation system in a third embodiment of the present invention.

A configuration of the wind power generation system of the present embodiment will be explained with reference to FIG. 21. Among the constitutional elements in the wind power generation system of the present embodiment as shown in FIG. 21, since ones bearing the same reference numerals as those in FIG. 1 are the same constitutional elements as in FIG. 1, the explanation thereof is omitted. In the wind power generation system of the present embodiment, a superior controller 3a receives a generation power prediction value PP of the wind power generation system from a generation power prediction supplier 9 via a signal line. The generation power prediction supplier 9 predicts the generation power prediction value PP in future from such as weather data in past, geographical data, current operating circumstances of the wind power generation system and operation date in past of the wind power generation system.

A configuration of the superior controller 3a will be explained with reference to FIGS. 22 through 25. Among the configuration of the superior controller 3a of the present embodiment, different points from the superior controller 3 (FIG. 8) of embodiment 1 only relate to a power storage system SOC target value computing unit 3b-1, a power storage system charge and discharge power command computing unit 3b-3 and a group of wind turbine generators power limiting command computing unit 3b-4. Among the constitutional elements in the superior controller 3a, since the other elements are the same as those in embodiment 1, the explanation thereof is omitted.

Figure 22:
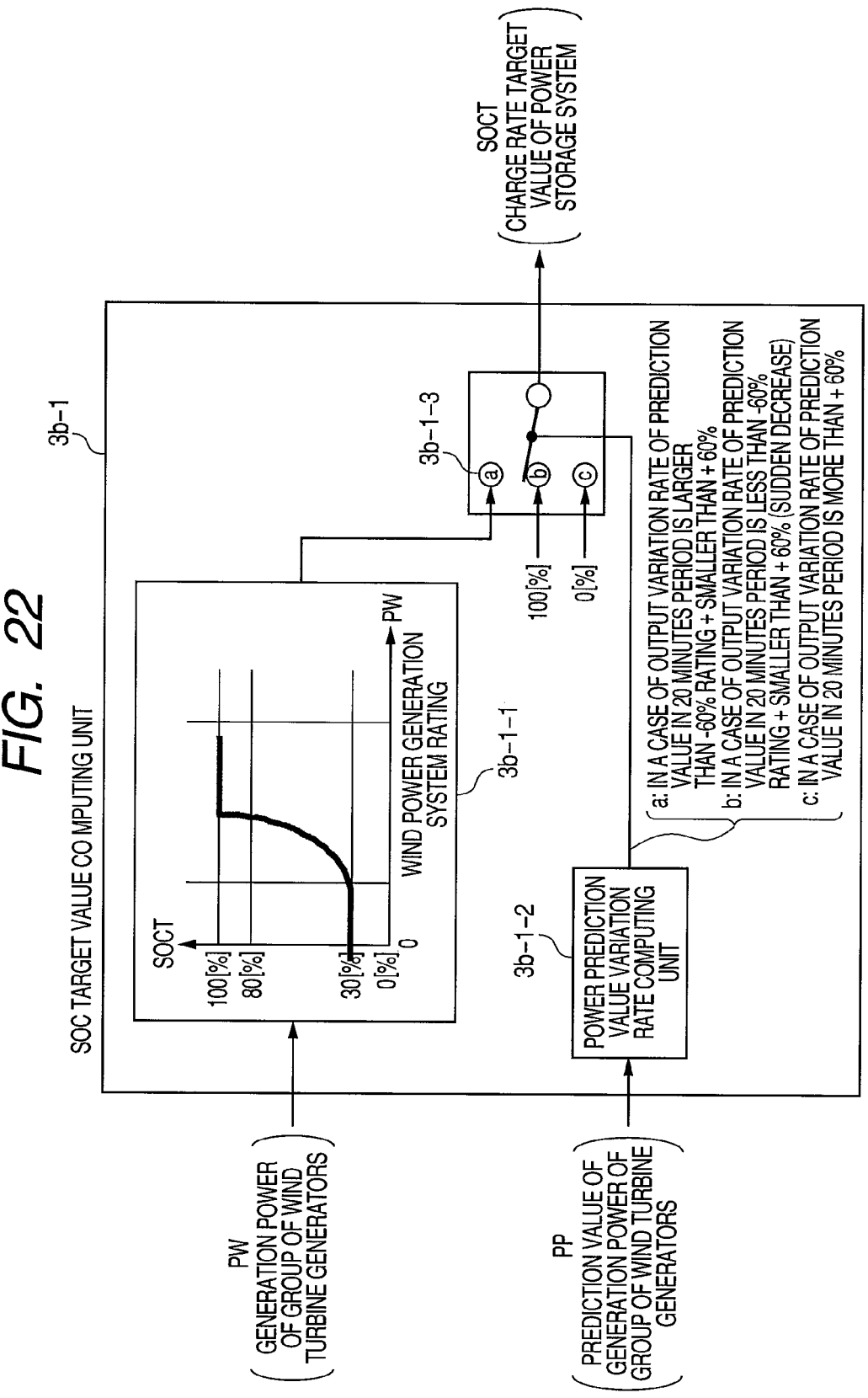
FIG. 22 is a diagram showing a charge rate target value preparing means in the third embodiment of the present invention.

An operation of the SOC target value computing unit 3b-1 will be explained with reference to FIG. 22. In FIG. 22, since the operation of 3b-1-1 is the same as that of the SOC target value computing unit 3-1 of embodiment 1, the explanation thereof is omitted. A power prediction value variation rate computing unit 3b-1-2 inside the SOC target value computing unit 3b-1 seeks events that largely vary the generation power prediction value PP in near future. When the generation power prediction value PP increases suddenly in near future, the SOC target value is set small. Further, when the generation power prediction value PP decreases suddenly in near future, the SOC target value is set large. When no sudden variation in the generation power prediction value PP is predicted in near future, the SOC target value is determined from the generation power PW of the group of wind turbine generators like embodiment 1. As will apparent from the above, in the present embodiment, the wind power generation system includes means for varying the target value SOCT of SOC based on the generation power prediction value PP along with the operation of the SOC target value computing unit 3b-1 of the power storage system 2.

Figure 23:
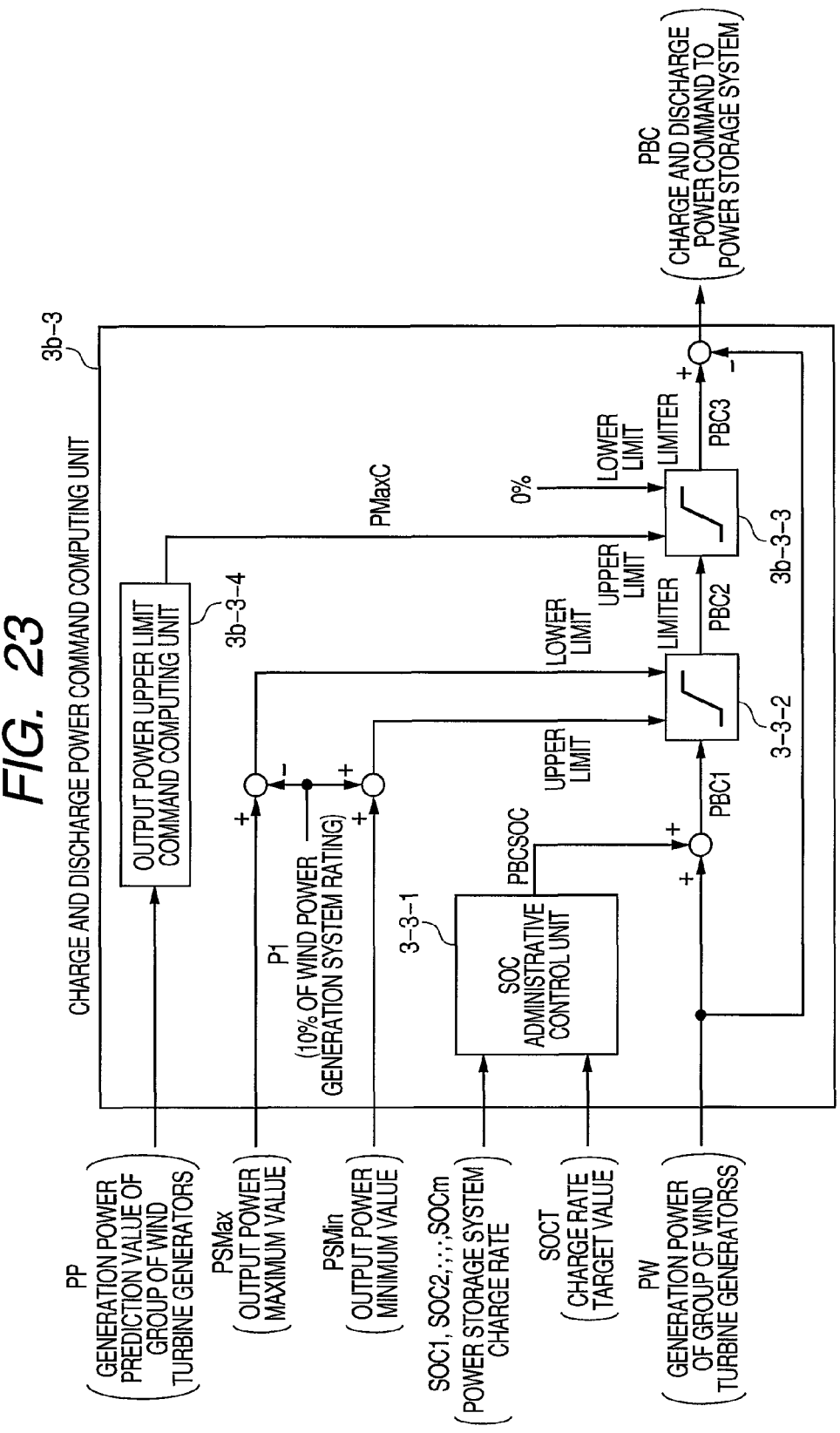
FIG. 23 is a diagram showing a charging and discharging power command preparing means in the third embodiment of the present invention.

Now, an operation of a charge and discharge power command computing unit 3b-3 of the present embodiment will be explained with reference to FIG. 23. Among the charge and discharge power command computing unit 3b-3 as shown in FIG. 23, since the constitutional elements bearing the same reference numerals as those in the charge and discharge power command computing unit 3-3 in FIG. 11 operate likely as in embodiment 1, the explanation thereof is omitted. The charge and discharge power command computing unit 3b-3 of the present embodiment sets in a limiter 3b-3-3 the output power upper limit command PMaxC in place of the upper value of the rated value of the wind power generation system. The PMaxC is computed in a generation power system upper limit value computing unit 3b-3-4 from the output power prediction value PP of the group of wind turbine generators.

Figure 24:
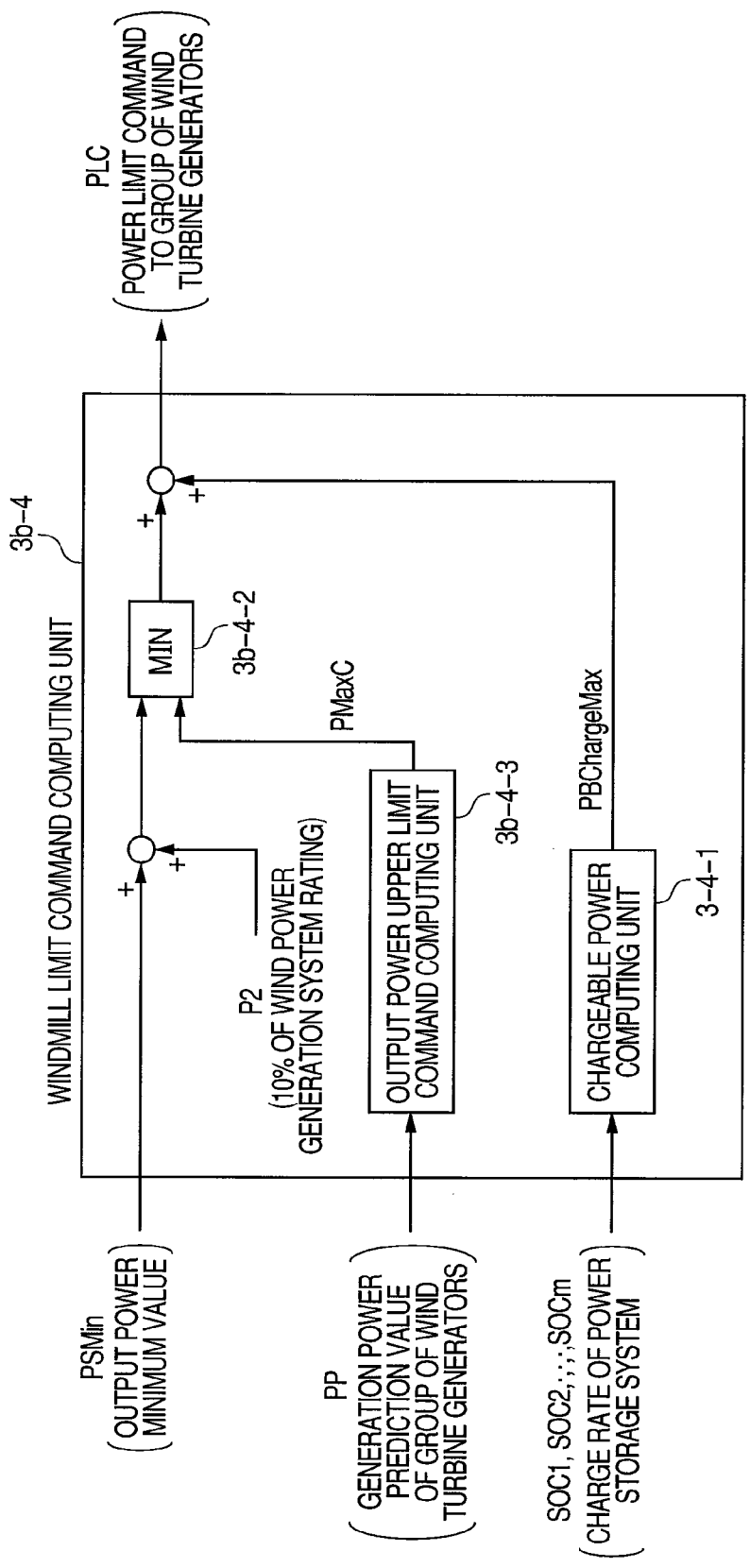
FIG. 24 is a diagram showing a power limiting command preparing means in the third embodiment of the present invention.

Now, an operation of a power limit command computing unit 3b-4 of the present embodiment will be explained with reference to FIG. 24. Among the power limit command computing unit 3b-4 of the group of wind turbine generators as shown in FIG. 24, since the constitutional elements bearing the same reference numerals as those in the power limit command computing unit 3-4 of the group of wind turbine generators in FIG. 13 operate likely as in embodiment 1, the explanation thereof is omitted. The power limit command computing unit 3b-4 of the group of wind turbine generators of the present embodiment compares (PSMin+10% of the rating) and PMaxC in a minimum value selection computing unit 3b-4-2 and selects smaller one. The PMaxC is computed in an output power upper limit value command computing unit 3b-4-3 from the output power prediction value PP of the group of wind turbine generators.

Figure 25:
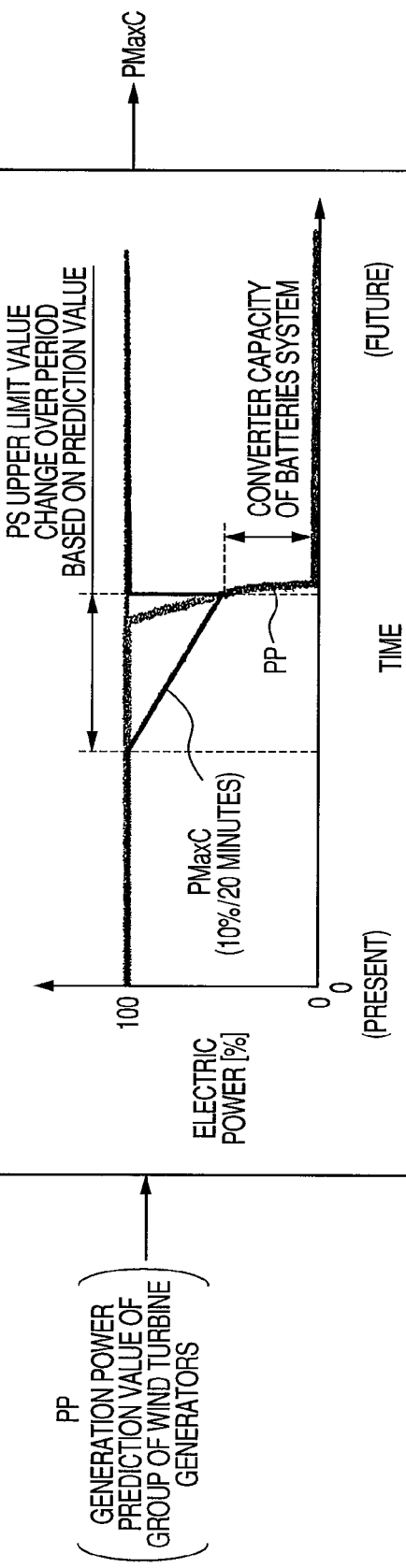
FIG. 25 is a diagram showing an output power upper limit value computing means in the third embodiment of the present invention.

Operations of the generation power system upper limit value computing unit 3b-3-4 and the output power upper limit value command computing unit 3b-4-3 will be explained with reference to FIG. 25. The generation power system upper limit value computing unit 3b-3-4 (3b-4-3) seeks from the generation power prediction value PP events that suddenly deceases the generation power prediction value PP in future, and prepares in response thereto the output power upper limit command PMaxC. Specifically, the PMaxC is gradually decreased until the time when PP suddenly decreases. Further, the PMaxC is set in such a manner that the PMaxC is decreased in a speed, for example, with a fixed ratio of, for example, 10[%] of the rating/20 [minute] and the PMaxC assumes the rated capacity of the power storage system 2 at the time when PP decreases suddenly. Further, in a time band when no sudden variation of PP is predicted, the PMaxC is set at the rated value of the wind power generation system.

In the present embodiment, the group of wind turbine generators includes means for varying the output power upper limit command PMaxC of the group of wind turbine generators with the windmill generation power prediction value PP based on weather forecast through operations of the charge and discharge power command computing unit 3b-3, the power limit command computing unit 3b-4 and the generation power system upper limit value computing unit 3b-3-4, and means for suppressing the output power of the wind power generation system below the PMaxC through the power limiting function of the group of wind turbine generators and through the charging operation of the power storage system 2.

Figure 26A:
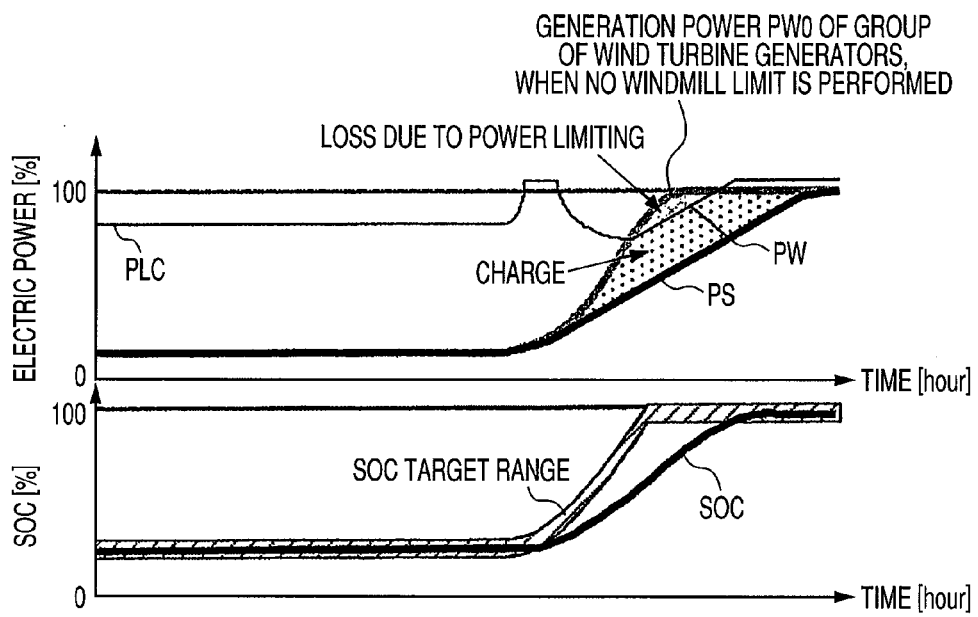
FIG. 26 (a) is a diagram showing an example of operations of the wind power generation system when a generation power prediction value is not used in the third embodiment of the present invention.
Figure 26B:
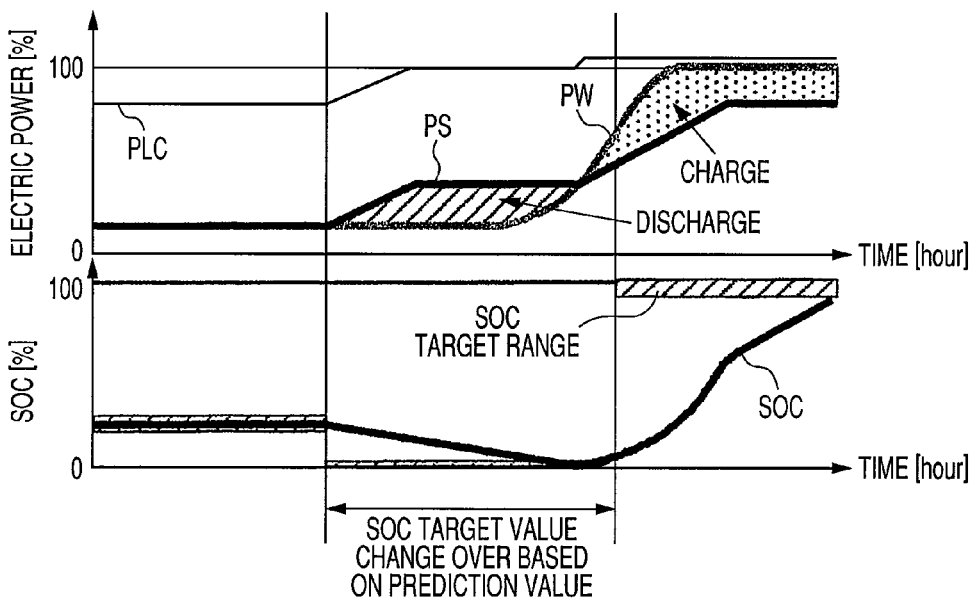

Examples of control operation performed by the present embodiment and the effect thereby will be explained with reference to FIGS. 26 and 27. FIGS. 26 (a) and 26 (b) show an exemplary operation during a phenomenon when the wind speed around the wind power generation system increases suddenly, and FIGS. 27 (a) and 27 (b) show an exemplary operation during a phenomenon when the wind speed decreases suddenly.

The operation when the wind speed increases suddenly will be explained with reference to FIGS. 26 (a) and 26 (b). Further, in the present embodiment, it is assumed that such as a lead acid battery, a sodium-sulfur battery and a lithium battery representing a secondary battery is used as the power storage system 2. A secondary battery generally possesses a property that under a condition of a high charge rate SOC a magnitude of chargeable power decreases. For this reason, when the power storage system performs the charging operation for mitigating the variation, it is desirable to keep the value of magnitude of the chargeable power by controlling the charge rate SOC of the power storage system 2 low.

FIG. 26 (a) shows an exemplary operation when a control according to embodiment 1 of the present invention is performed. In FIG. 26 (a), the wind power generation system varies the SOC target value in response to the generation power PW of the group of wind turbine generators. Therefore, in association with increase of the generation power PW, the charge rate SOC also increases. When the charge rate SOC assumes a high value, since the magnitude of the chargeable power becomes small, the variation rate cannot be mitigated only with the charging operation of the power storage system 2. In order to suppress the output power PS of the wind power generation system below a fixed value, the wind power generation system suppresses a residual electric power that cannot be charged to the power storage system through the power limiting function of the group of wind turbine generators. As a result, a loss of natural energy is caused by the power limiting.

FIG. 26 (b) shows an exemplary operation when a control according to embodiment 3 of the present invention is performed. In FIG. 26 (b), the target value SOCT of SOC is set 0[%] before the generation power PW increases suddenly along with the operation of the SOC target value computing unit 3b-1 as shown in FIG. 22. Due to this effect, since the SOC decreases near to 0[%], immediately before when PW increases suddenly, the SOC can be kept at a comparatively low value even in a period after the sudden increase of PW. Because the SOC is kept low, the magnitude of chargeable power of the power storage system increases, therefore, the variation rate of PS can be suppressed below a fixed value only by the charging operation of the power storage system 2 without using the power limitation. A substantial electric power charged to the power storage system 2 can be discharged to an electric power system, therefore, the natural energy can be effectively utilized in comparison with FIG. 26 (a) example where the variation is suppressed by the power limitation.

Now, an operation when the wind speed decreases suddenly will be explained with reference to FIG. 27. In FIG. 27 (b), the rating of the converter in the power storage system 2 is assumed as 50[%] of the rating of the group of wind turbine generators 1. FIG. 27 (a) shows an exemplary operation when a control according to embodiment 1 of the present invention is performed. In association with a sudden decrease of the wind speed, the generation power PW of the group of wind turbine generators 1 decrease suddenly. At the time of the sudden decrease of PW, the wind power generation system performs a discharging operation from the power storage system so as to mitigate the variation of the output power PS, however, since the rated capacity of the power storage system is limited to 50% of the rating, a sufficient mitigation of the variation cannot be performed and a large variation is caused.

Figure 27A:
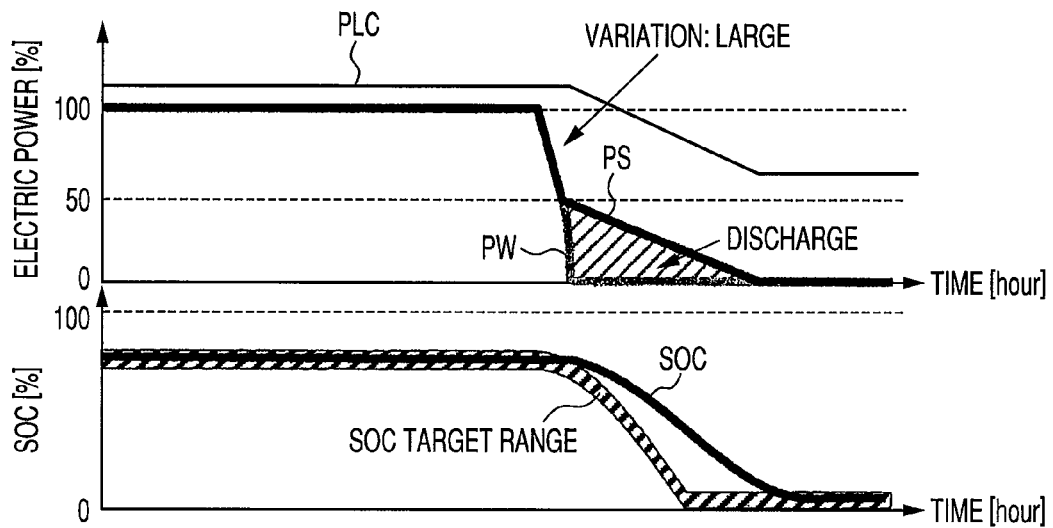
FIG. 27 (a) is a diagram showing an example of operations of the wind power generation system when a generation power prediction value is not used in the third embodiment of the present invention.
Figure 27B:
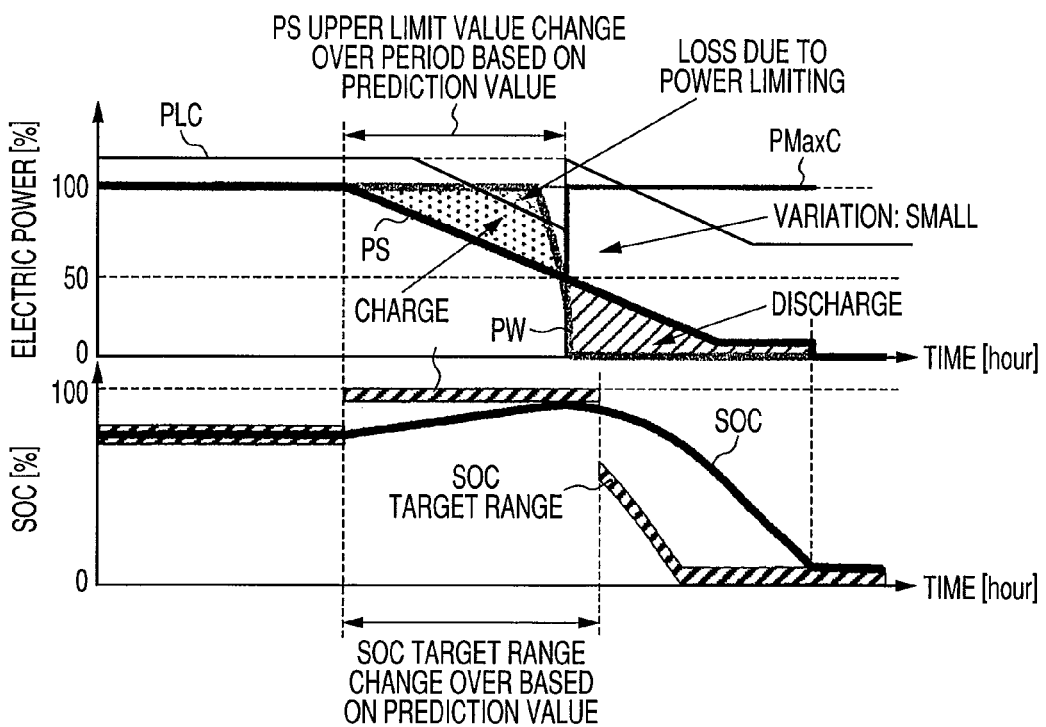

FIG. 27 (b) shows an exemplary operation when a control according to embodiment 3 of the present invention is performed. In FIG. 27 (b), the wind power generation system varies the SOC target value in response to the generation power prediction value PP based on weather forecast as shown in FIG. 22 as well as varies the output power upper limit command PMaxC of the output power PS of the wind power generation system in response to PP as shown in FIG. 23. By setting the SOC target value at 100[%] of the rating immediately before when the generation power PW of the group of wind turbine generators is suddenly decreased, a necessary discharge power energy for variation mitigation can be preserved before hand in the power storage system 2 after the sudden decrease of the generation power PW. Further, through an operation of decreasing the output power upper limit command PMaxC to about the converter capacity of the power storage system 2 prior to the sudden decrease of PW, the variation rate of the output power PS can be mitigated below a fixed value (in the present embodiment, the variation width in 20 minutes period is below 10% rating) by a discharging operation of the power storage system 2 immediately after the sudden decrease of the generation power PW. Due to this effect, the wind power generation system of the type provided with batteries can be easily introduced and the natural energy can be effectively utilized.

Further, the signal line 8 as shown in FIG. 21 is constituted by such as networks such as LAN, WAN and the like, and a dedicated line. Further, even with an embodiment of receiving the generation power prediction value PP through such as a wireless signal without using the signal line 8, the effect of the present invention is unchanged.

As has been explained hitherto, the wind power generation system of the present embodiment includes means for varying the charge rate target value SOCT of the power storage system 2 based on the power generation prediction value PP of the group of wind turbine generators 1 and means for varying the charge rate SOC of the power storage system 2 based on the SOCT. Further, the wind power generation system of the present invention includes means for varying the output power upper limit command PMaxC of the wind power generation system based on the power generation prediction value PP of the group of wind turbine generators 1 and means for suppressing the output power PS below PMaxC based on the PMaxC. Due to the effect of the present invention, even under a condition where the wind speed increases suddenly, the energy loss by means of the power limitation can be avoided and the natural energy can be effectively utilized. Further, under a condition of sudden decrease of the wind speed, even when the rated capacity of the power storage system 2 is small, the variation of the output power PS can be mitigated. Thereby, the wind power generation system of the type provided with batteries can be easily introduced and the natural energy can be effectively utilized.

[Embodiment 4]

Figure 28:
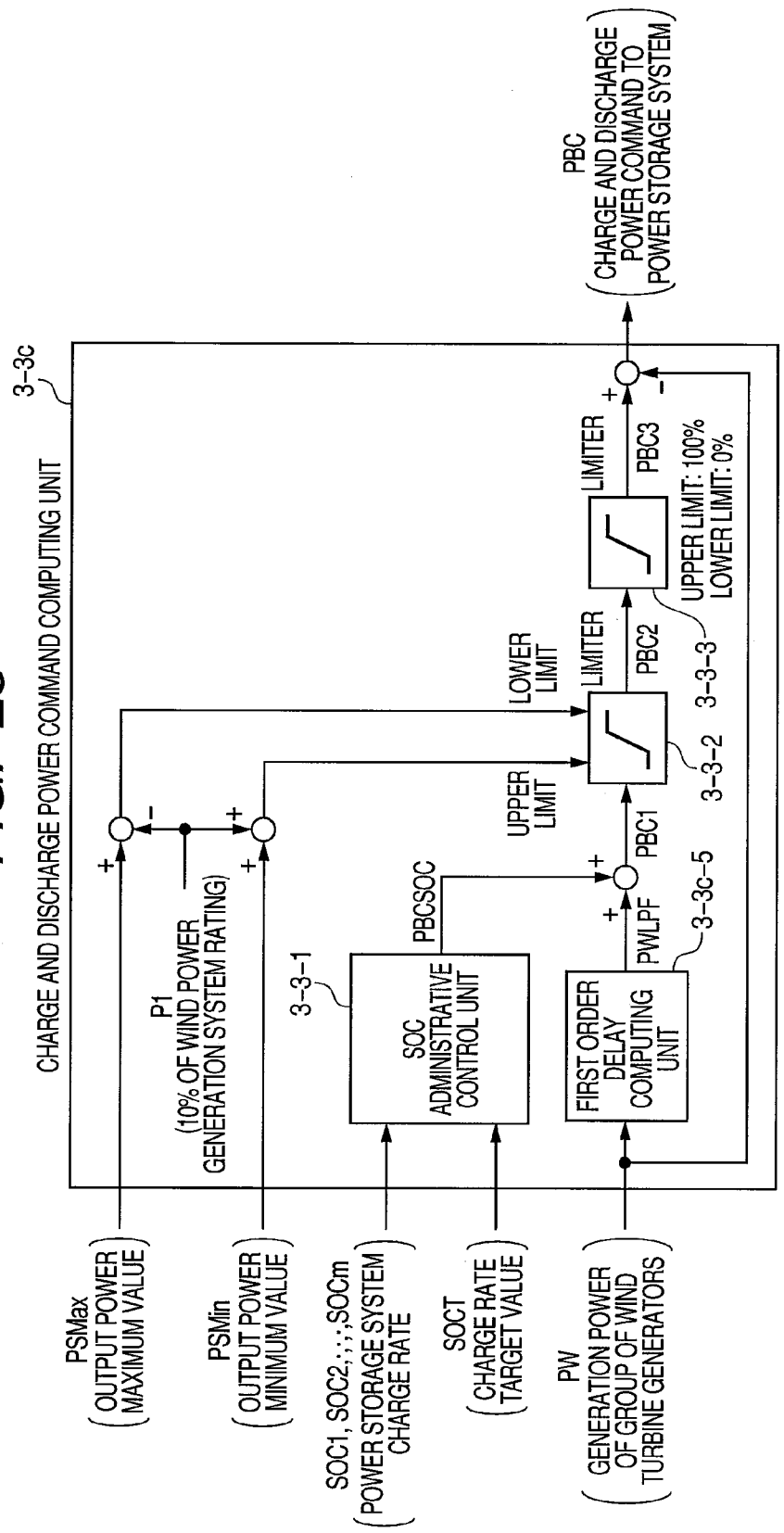
FIG. 28 is a diagram showing a charging and discharging power command preparing means in a fourth embodiment of the present invention.
Figure 29:
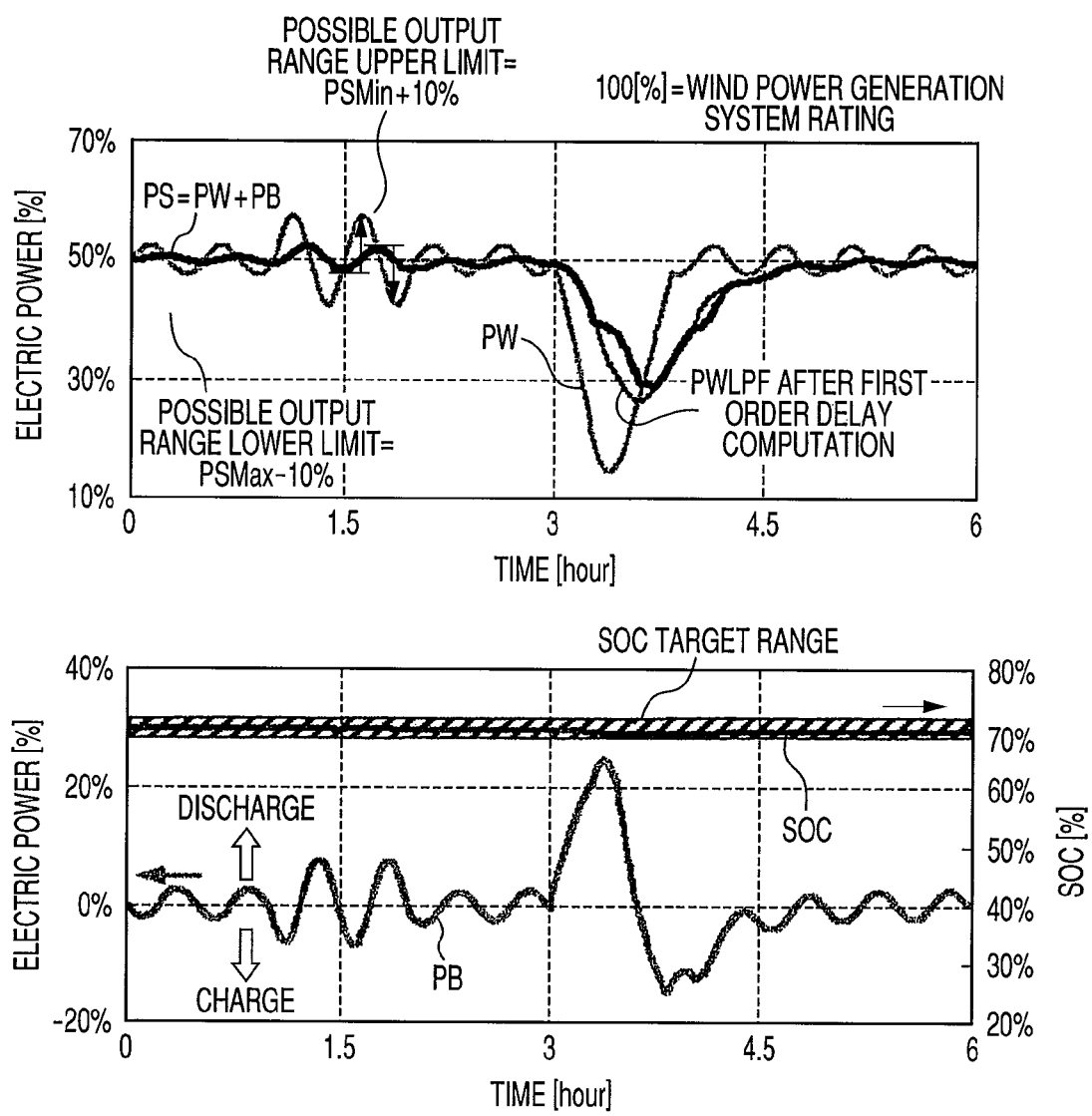
FIG. 29 is a diagram showing an example of operations of the wind power generation system in the fourth embodiment of the present invention.
Figure 30:
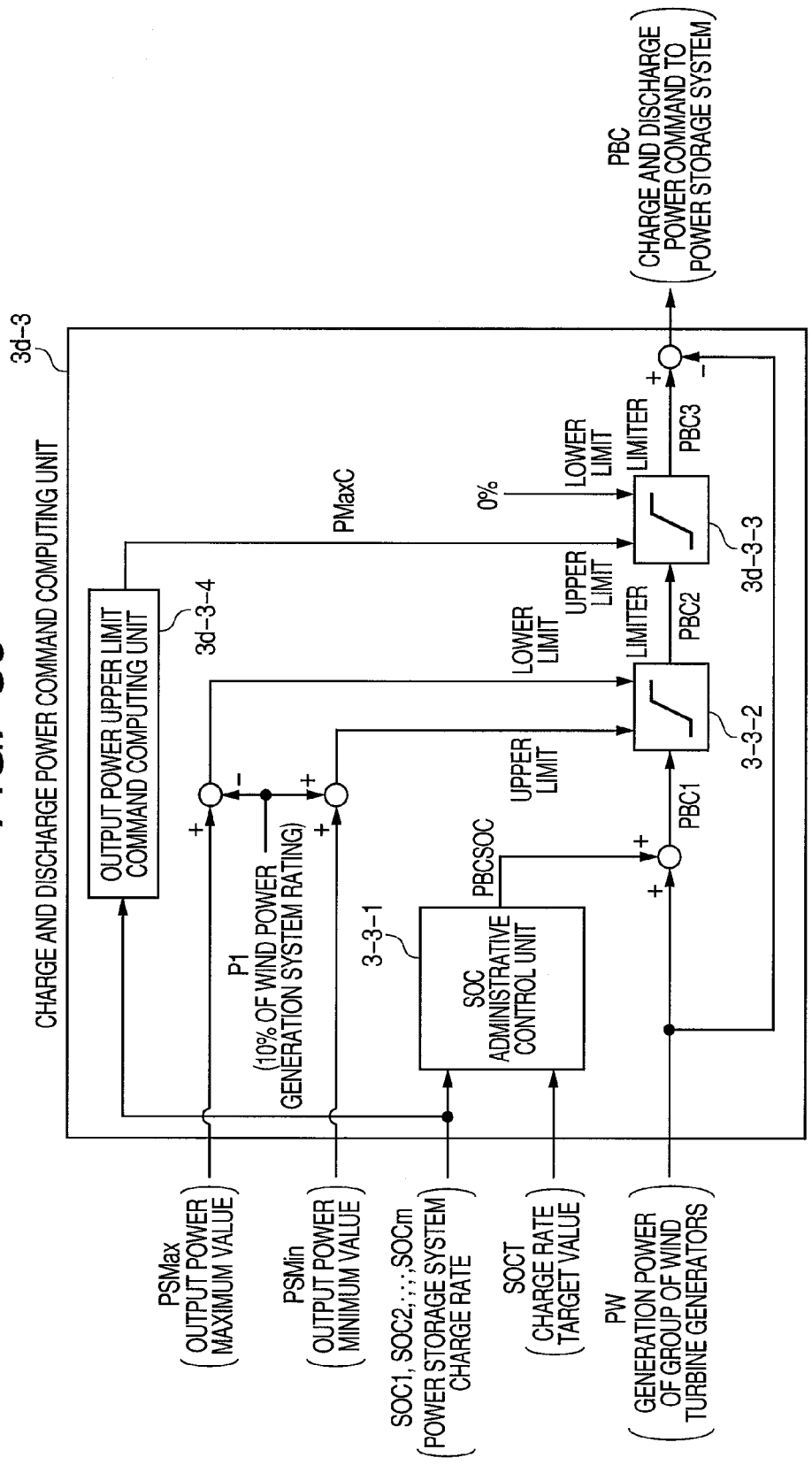
FIG. 30 is a diagram showing a charging and discharging power command preparing means in a fifth embodiment of the present invention.

A fourth embodiment of the present invention will be explained with reference to FIGS. 28 and 29. Since the fundamental configuration of the wind power generation system of the present embodiment is substantially the same as embodiment 1, a detailed explanation thereof is omitted. Most significant features of the present embodiment are that when the variation of the generation power PW of the group of wind turbine generators 1 is comparatively small, the batteries perform charging or discharging so that the output power PS of the wind power generation system follows up a first order delay command of the generation power PW and when the variation PW of the group of wind turbine generators 1 exceeds a reference width, the batteries perform charging or discharging so that PS remains in the reference width without following up the first order delay command.

A control system of the present embodiment will be explained with reference to FIG. 28. FIG. 28 is a diagram showing a control system of a charge and discharge power command computing unit 3-3c in the superior controller 3 of the present embodiment. Since the other control systems in the superior controller 3 of the present embodiment are the same as those in embodiment 1, the explanation thereof is omitted.

The charge and discharge power command computing unit 3-3c prepares an intermediate value PWLPF in a first order delay computing unit 3-3c-5 by applying a first order delay computation to the generation power PW of the group of wind turbine generators 1. The charge and discharge power command computing unit 3-3c prepares an intermediate PBSOC of the charge and discharge power command for SOC administration in the SOC administrative control unit 3-3-1. The charge and discharge power command computing unit 3-3c prepares a value PBC1 obtained by adding PWLPF to PBSOC and determines an intermediate value PBC3 of the charge and discharge power command by subjecting limiters 3-3-2 and 3-3-3 to the value PBC1. The charge and discharge power command computing unit 3-3c determines a charge and discharge power command PBC by subtracting PW from the intermediate value PBC3. The upper limit value of the first limiter 3-3-2 is set at a value obtained by adding 10% of the rating of the wind power generation system to PSMin and the lower limit value thereof is set at a value obtained by subtracting 10% of the rating of the wind power generation system from PSMax. Due to the effect of the limiter 3-3-2, the variation of the output power PS of the wind power generation system can be suppressed below 10% of the rating in any 20 minutes period.

An effect of the present embodiment will be explained with reference to FIG. 29. FIG. 29 is a diagram showing an exemplary operation of the wind power generation system of the present embodiment. The wind power generation system of the present embodiment prepares a possible output range R with which the variation of the output power PS of the wind power generation system remains within 10% of the rating in the 20 minutes period. When PWLPF stays in the possible output range R, the charge and discharge power of the power storage system 2 is controlled so that the generation power PS of the wind power generation system follows up the PWLPF. When the PWLPF deviates from the possible output range R, the charge and discharge power of the power storage system 2 is controlled so that the PS coincides with the upper limit or the lower limit of the possible output range R.

When the wind power generation system performs the control as shown in the present embodiment, even when the time constant of the first order delay follow up is a small value, the variation of the generation power of the wind power generation system can be suppressed below a predetermined value. Due to this effect, in comparison with the case where only the operation of the first order delay follow up is performed, an amount of charge and discharge power of the power storage system 2 can be reduced. Since the amount of charge and discharge power of the power storage system 2 is decreased, a loss caused in the power storage system 2 can be decreased which leads to an effective utilization of natural energy.

[Embodiment 5]

A fifth embodiment of the present invention will be explained with reference to FIGS. 30 through 34. A difference of the present embodiment from embodiment 2 is to determine the output power upper limit command PMaxC of a wind power generation system from an accumulated energy in the power storage system 2.

Different parts of the of the present embodiment from embodiment 2 with regard to the configuration will be explained with reference to FIGS. 30 through 33. A charge and discharge command computing unit 3d-3 of the present embodiment will be explained with reference to FIG. 30. A different part of the charge and discharge command computing unit 3d-3 of the present embodiment from the charge and discharge command computing unit 3a-3 of embodiment 2 is to determine the upper limit value PMaxC of a limiter 3d-3-3 from the charge rate SOC of the power storage system 2 in place of the predetermined value. Since other parts of the charge and discharge command computing unit 3d-3 of the present embodiment are the same as those of the charge and discharge command computing unit 3a-3 of embodiment 2, the explanation thereof is omitted.

Figure 31:
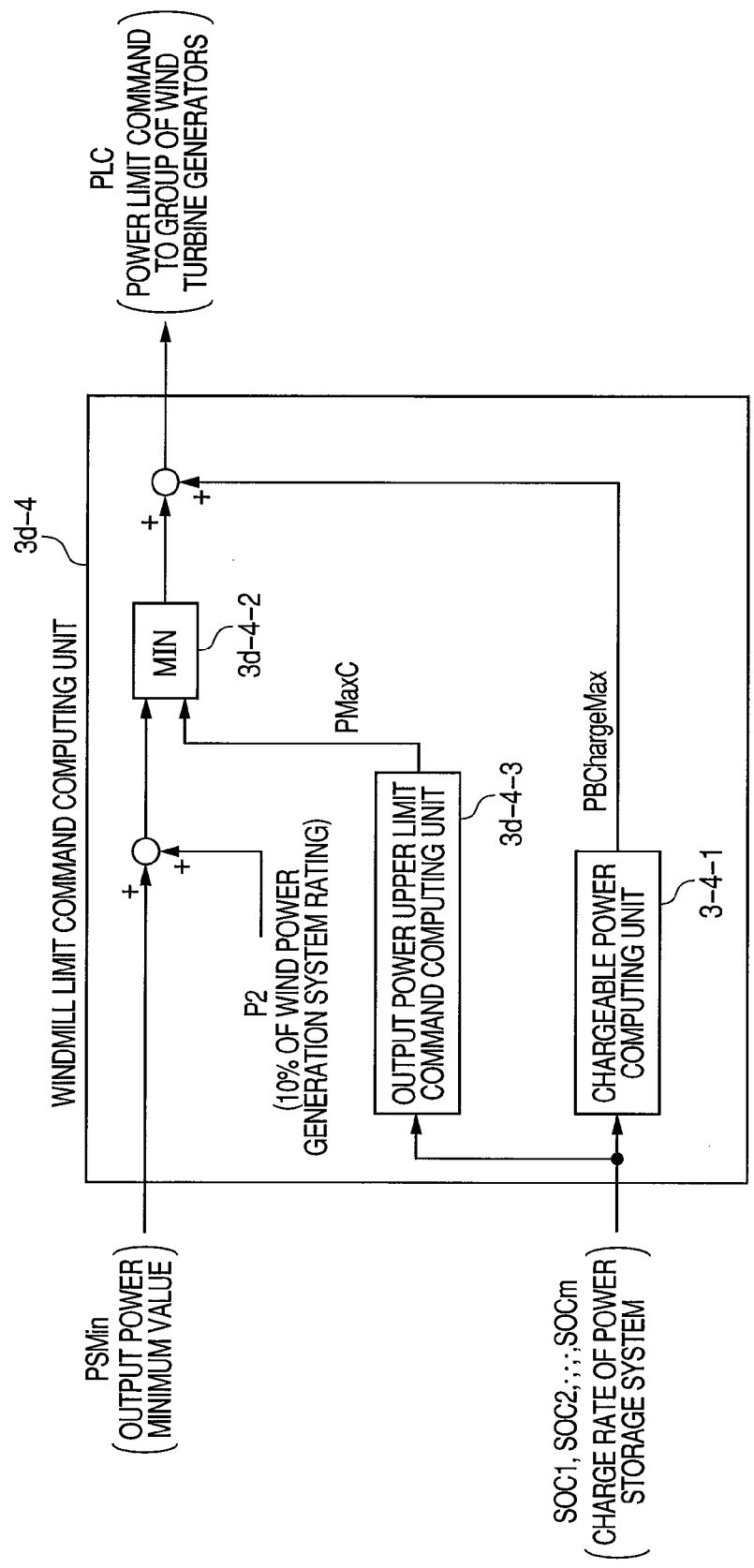
FIG. 31 is a diagram showing a power limiting command preparing means in the fifth embodiment of the present invention.

Now, an operation of a power limit command computing unit 3d-4 of the present embodiment will be explained with reference to FIG. 31. Different part of the power limiting command computing unit 3d-4 of the present embodiment from the power limiting command computing unit 3a-4 of embodiment 1 is to determine the upper limit value PMaxC of a limiter 3d-3-3 from the charge rate SOC of the power storage system 2 in place of the predetermined value. Since other parts of the power limit command computing unit 3d-4 of the present embodiment are the same as those of the charge and discharge command computing unit 3a-4 of embodiment 2, the explanation thereof is omitted.

Figure 32:
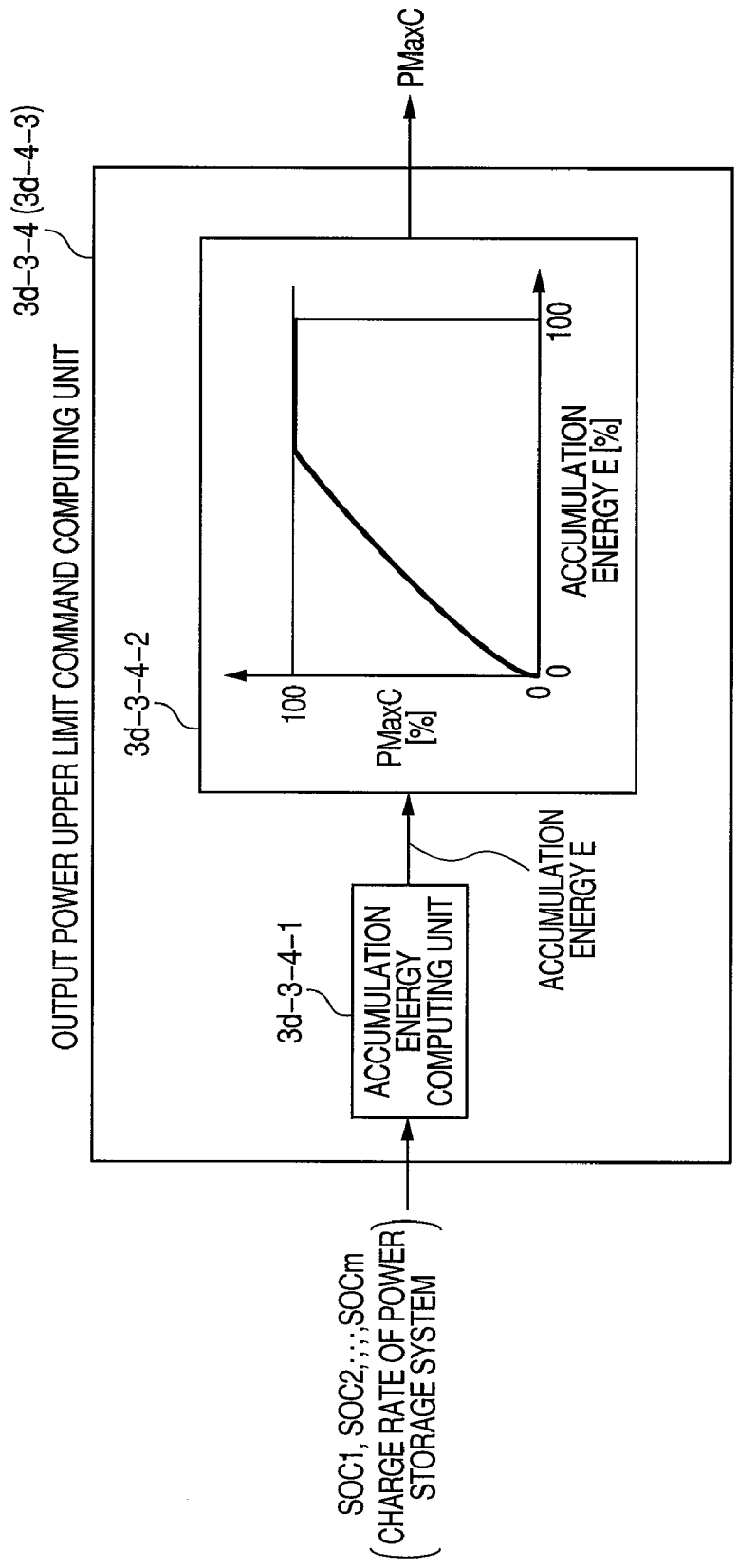
FIG. 32 is a diagram showing a power limiting command preparing means in the fifth embodiment of the present invention.

Now, an operation of an output power upper limit command computing unit 3d-3-4 (3d-4-3) will be explained with reference to FIG. 32. The output power upper limit command computing unit 3d-3-4 (3d-4-3) for the first time computes a dischargeable accumulation energy E of the power storage system 2 from the charge rate SOC of the power storage system 2 in an accumulation energy computing unit 3d-3-4-1. The output power upper limit command computing unit 3d-3-4 (3d-4-3) stores in advance the output power upper limit command PMaxC corresponding to the accumulation energy E and selects a PMaxC in a output power upper limit command selection unit 3d-3-4-2.

Figure 33:
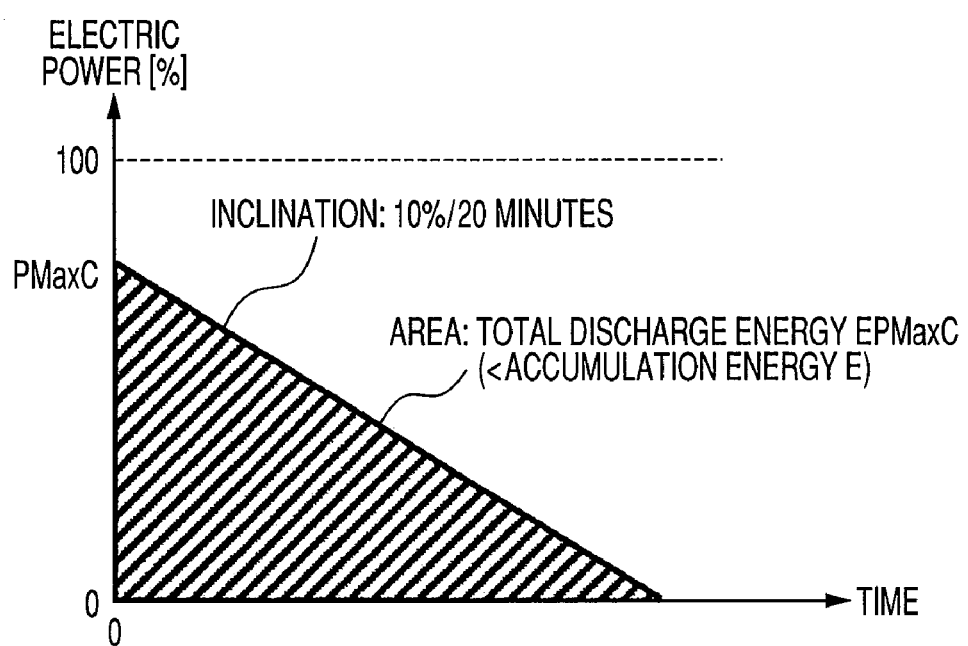
FIG. 33 is a diagram for explaining a relationship between an accumulated energy and a power limiting command in the fifth embodiment of the present invention.

FIG. 33 shows a relationship between the accumulation energy E and the output power upper limit command PMaxc. Wherein necessary total discharge energy is assumed as EPMaxC, at the time when the power storage system 2 performs a discharge from the power PMaxC in accordance with a variation rate under a restriction (10%/20 minutes) for variation mitigation. In this instance, a relationship as shown in the following formula 3 is given between EPMaxC and E.

total discharge energy EPMaxC<accumulation energy E  (Formula 3)

By giving the relationship as shown in formula 3, even when a generation power of the group of wind turbine generators 1 is suddenly decreases, the variation of output power can be suppressed below the restriction value (10%/20 minutes) through the discharge from the power storage system 2.

Figure 34A:
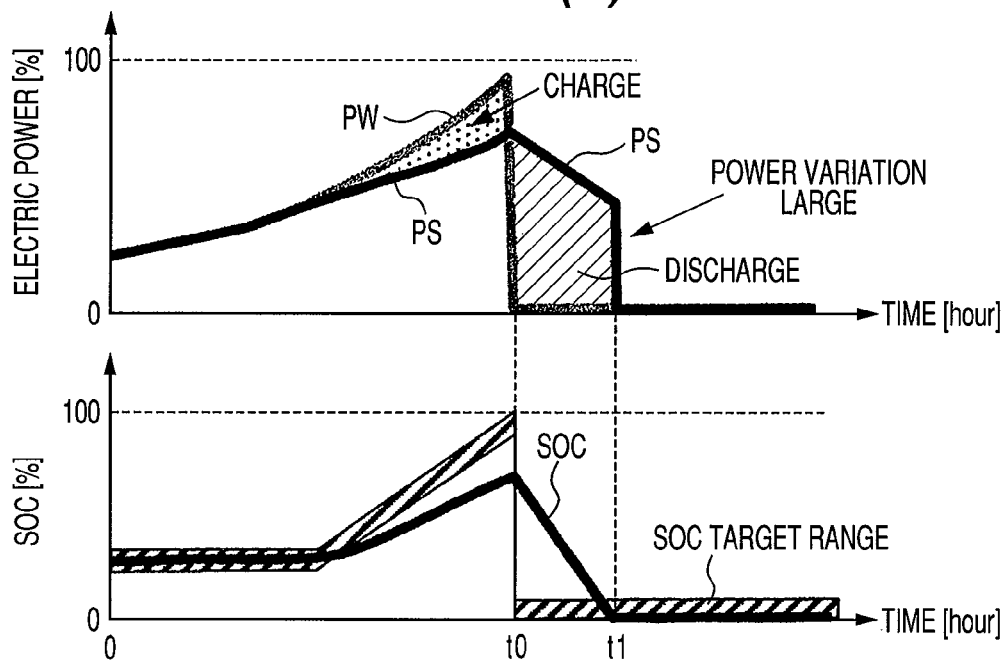
FIG. 34 (a) is a diagram showing a control operation in the first embodiment of the present invention.
Figure 34B:
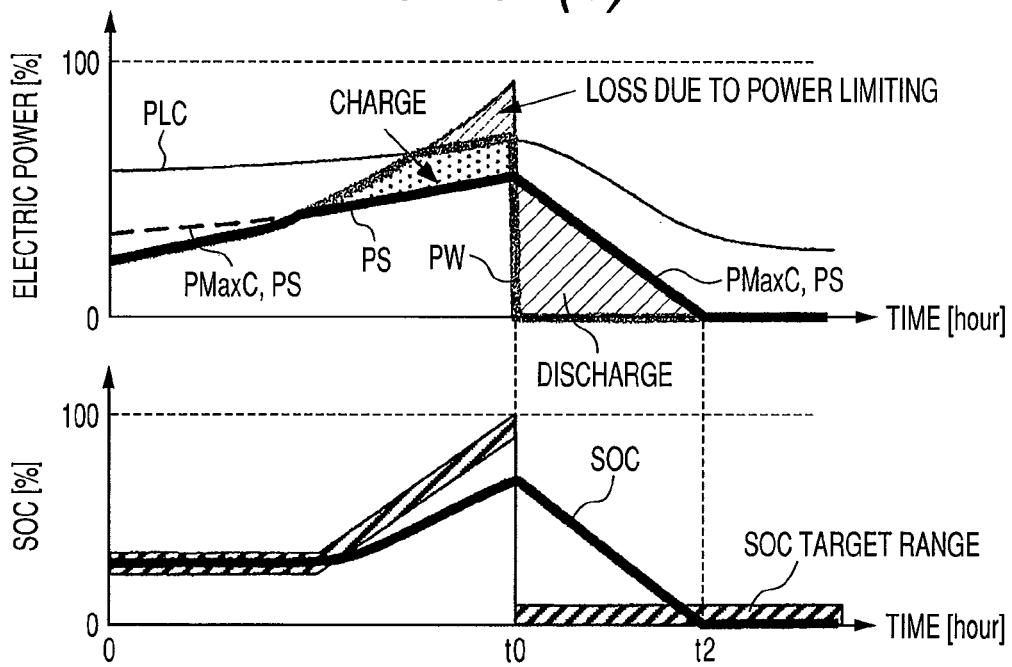

An effect of the present embodiment will be explained with reference to FIG. 34. FIG. 34 represents an event when a generation power PW of the group of wind turbine generators 1 suddenly decreases. FIG. 34 (a) is a diagram showing an operation in the case with no output power limiting as shown in embodiment 1. In FIG. 34 (a), the SOC target range likely increases in response to the increase of the generation power in the period before time t0. When the SOC follows up the SOC target range, a time delay may be caused as shown in FIG. 34 (a). Therefore, a shortage of accumulation energy which is necessary to discharge may be caused. In FIG. 34 (a), the windmill output suddenly decreases at time t0 and thereafter the power storage system 2 performs a charging operation for mitigating the power variation. However, since the SOC reaches 0% (shortage of accumulation energy) at the time t1, the discharge operation is disabled and a large power variation is caused.

On the other hand, according to the control method of the present embodiment as shown in FIG. 34 (b), The output power upper limit PMaxC is varied in response to the accumulation energy (or SOC) of the power storage system. Due to this effect, the output power PS assumes a small value even at time t0, therefore, even when the windmill output decreases suddenly at time t0, an accumulation energy sufficient for the power storage system 2 to discharge is preserved, thereby, the power variation can be suppressed below the restriction value through the discharging operation.

Further, the application of the limiting method of the output power PS of the wind power generation system as shown in the present embodiment is not limited to the charging and discharging control of batteries as shown in embodiment 1, other control methods such as of following up a first order delay signal of a generation power PW can be used as a control method of batteries.

By limiting the output power PS of the wind power generation system in response to the accumulation energy of the power storage system 2 as shown in the present embodiment, even when an event occurs where a generation power of the group of wind turbine generators 1 decreases suddenly, the variation rate of the power can be further reliably suppressed below the restriction value. Due to this effect, a power plant of this type can easily introduced and natural energy can be utilized effectively.

[Embodiment 6]

Figure 35:
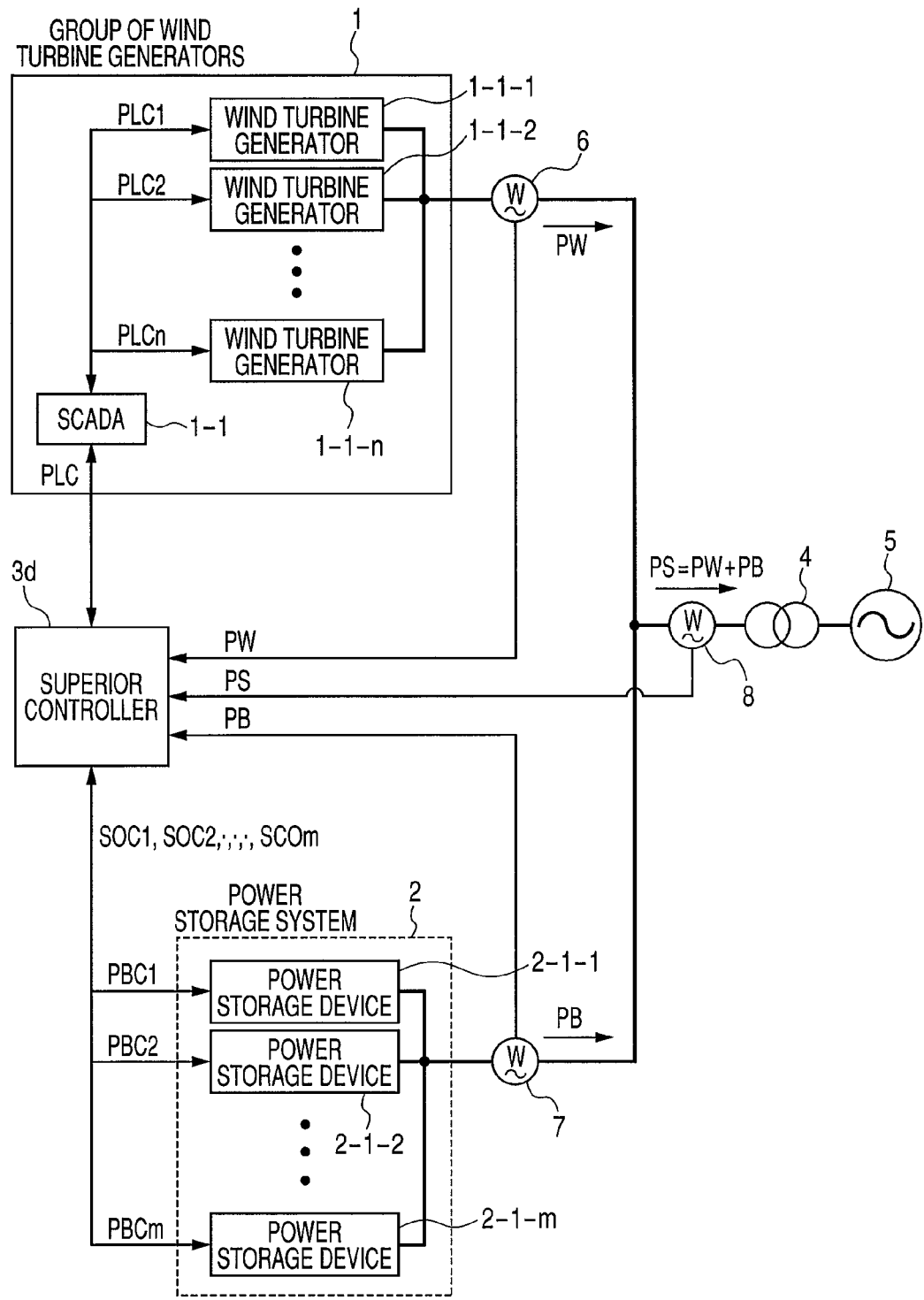
FIG. 35 is a diagram showing configuration of a wind power generation system in a sixth embodiment of the present invention.
Figure 36:
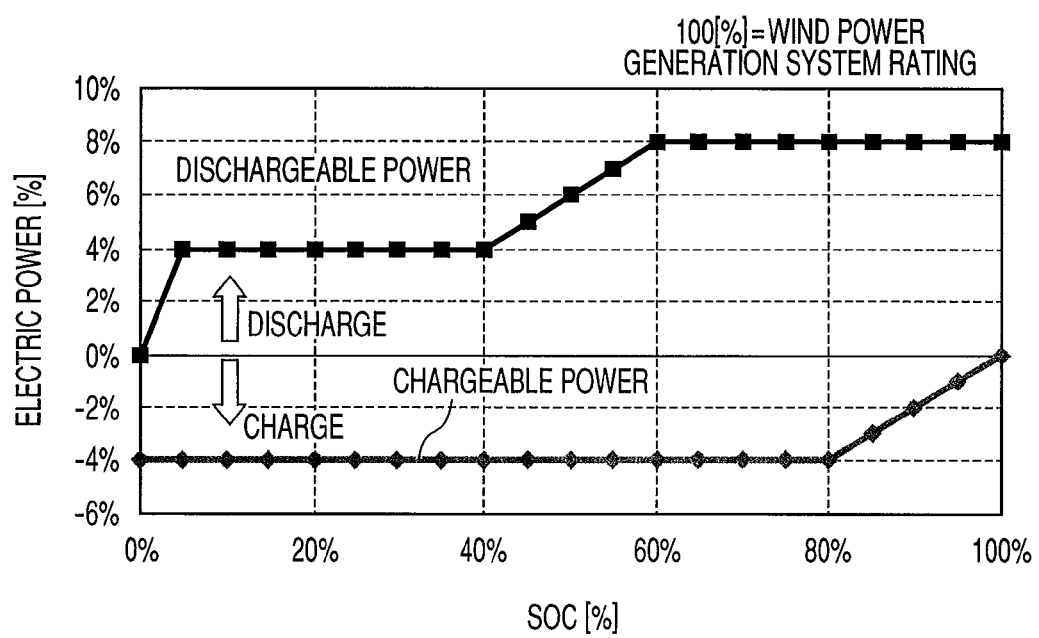
FIG. 36 is a diagram showing a possible charging and discharging range of a power storage device in the sixth embodiment of the present invention.

A sixth embodiment of the present invention will be explained with reference to FIGS. 35 and 36. A configuration of the wind power generation system of the present embodiment is shown in FIG. 35. Constitutional elements in FIG. 35 bearing the same reference numerals as those in embodiment 1 represent the same constitutional elements as in embodiment 1. A most significant feature of the present embodiment is to control SOCs of respective power storage devices 2-1-1, 2-1-2, . . . 2-2-m in respectively different values.

In the present embodiment, it is assumed that such as a lead acid battery, a sodium-sulfur battery and a lithium battery representing a secondary battery is used as the batteries constituting the power storage devices. A value of charge and dischargeable power of a secondary battery varies depending on SOC thereof because of its property. Therefore, generally, when SOC of a battery is high, a magnitude of chargeable power tends to decrease and oppositely, when SOC is low, a magnitude of dischargeable power tends to decrease. FIG. 36 is a diagram showing a relationship between charge rate SOC and charge and dischargeable power of the power storage devices 2-1-1, 2-1-2, . . . 2-2-m shown in FIG. 35. When the charge rate of the power storage devices 2-1-1, 2-1-2, . . . 2-2-m possess the characteristic as shown in FIG. 36, the range of charge and dischargeable power can be increased by controlling the charge rates of the respective power storage devices in different values.

An effect of the present embodiment will be explained with reference to FIGS. 37 (a) and 37 (b). In the present embodiment, it is assumed that the power storage system 2 is constituted by 10 power storage devices 2-1-1, 2-1-2, . . . 2-2-10 in total. Further, the capacity of the respective power storage devices is assumed 600 [kWh] in rating. FIG. 37 (a) shows a case where all of SOCs of the power storage devices are controlled in a same value (=40%). In this instance, the chargeable power and the dischargeable power of the power storage system in total are given 40% respectively according to the relationship between the charge rate SOC and charge and dischargeable power of the respective power storage devices (FIG. 36). On the other hand, FIG. 37 (b) shows a case where the SOCs of the power storage devices are varied for every power storage device. Specifically, for 6 power storage devices 2-1-1, 2-1-2, . . . 2-2-6, the SOCs thereof are controlled in 60% and for the remaining 4 power storage devices the SOCs are controlled in 10%. The amount of energy accumulated in total in the power storage system 2 is 2400 [kWh] that is the same when all of SOCs are controlled in the same value. In this instance, although the chargeable power in total of the power storage system is 40%, the dischargeable power expands to 64%. Due to the increase of the dischargeable power, a range of mitigating the variation can be expanded by the charge and discharge operation of the power storage system 2.

The superior controller 3d as shown in FIG. 35 determines SOC target values for the respective power storage devices 2-1-1, 2-1-2, . . . 2-2-10 so that the charge and dischargeable power of the power storage system 2 in total is maximized while satisfying a condition that the average SOC of the power storage system is constant or the accumulation energy is constant.

Due to the effect of the present embodiment, the charge and dischargeable power of the power storage system 2 is expanded and the range of mitigating the variation can be expanded by the charge and discharge operation thereof. Therefore, due to the variation mitigation, a capacity of the power storage system 2 necessary for the wind power generation system can be reduced. Due to the reduction of the capacity of the power storage system, the wind power generation system of the type provided with batteries can be easily introduced and which leads to an effective utilization of natural energy.

The present invention can be applicable to other power generation system of which output power varies largely in place of the group of wind turbine generators. Specifically, in place of the group of wind turbine generators, the present invention is applicable to such as a solar power generation system, a wave power generation system and combinations thereof.

[Embodiment 7]

Figure 38:
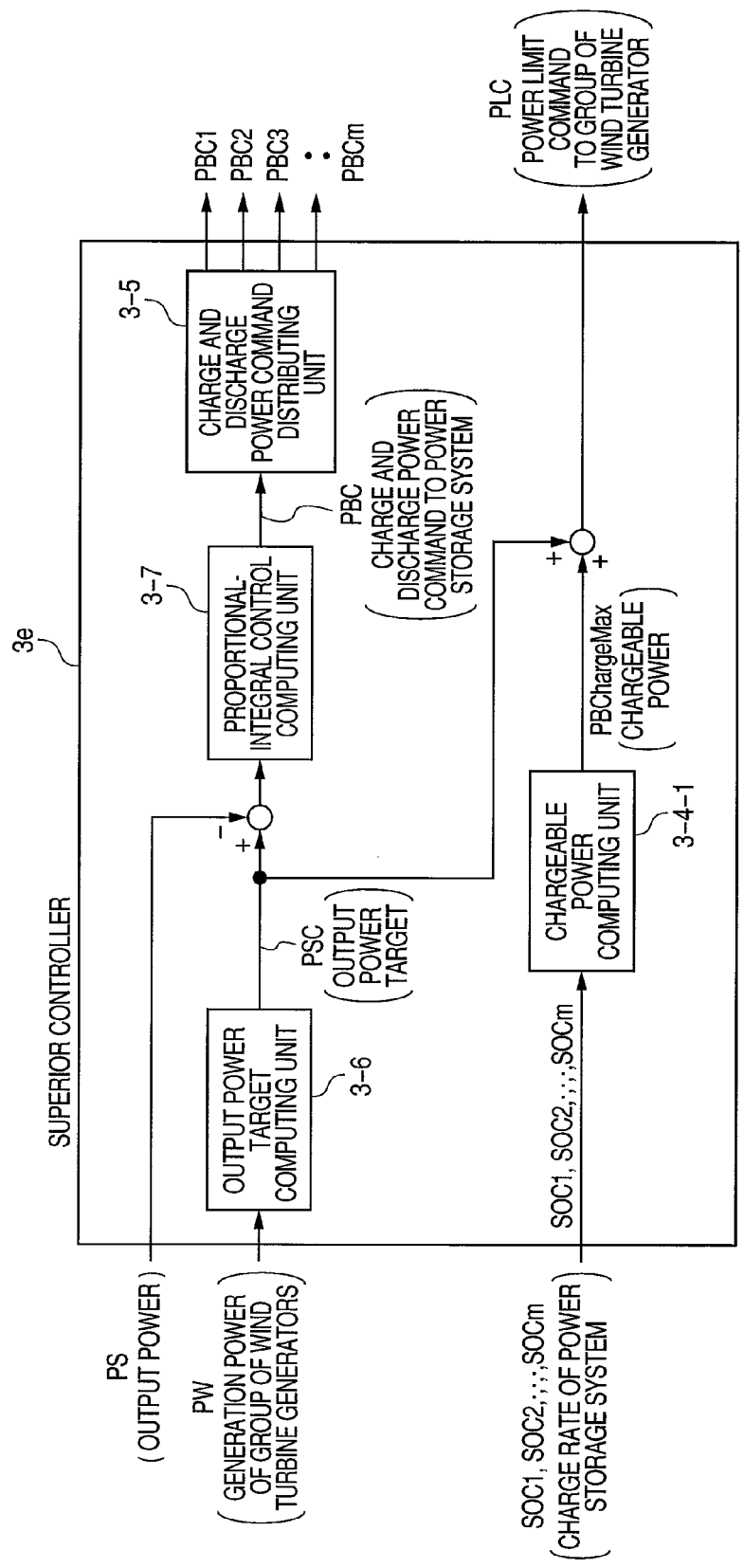
FIG. 38 is a diagram for explaining a control system in a superior controller in seventh embodiment of the present invention.

A seventh embodiment of the present invention will be explained with reference to FIG. 38 and FIGS. 39 (a) and (b). A most important feature of the present embodiment is that the function of the charge and discharge control for the power storage system is combined with the function of the power limiting for the wind power generation system.

The power limiting function in the previous embodiments was explained under the premise as applicable for the instance that a possible output range in the subsequent control period is determined from the maximum value and the minimum value in the output power of the group of wind turbine generators and the power storage system in a predetermined past period. However, in the present embodiment, the power limiting function is provided for instances other than the above instance.

Since the constitution of the wind power generation plant of the present embodiment is the same as that in FIG. 1 embodiment, the explanation thereof is omitted. Contents of the superior controller 3 will be explained in detail with reference to FIG. 38. Since the constitutional contents of the superior controller of the present embodiment are different from those of the pervious embodiments, the reference numeral of the superior controller in FIG. 38 is denoted as 3e.

The superior controller 3e computes in an output power target computing unit 3-6 an output power target value PSC for the wind power generation plant from a generation power PW of the wind power generation system. The output power target computing unit 3-6 computes the output power target value PSC as a physical quantity having a smaller temporal variation in comparison with the generation power PW of the wind power generation system. For example, the output power target computing unit 3-6 computes the output power target value PSC in first order-delay control as shown in formula 4.

$$PSC = \frac{1}{1 + Tm \cdot s} PW \qquad \text{(Formula 4)}$$

Tm in formula 4 represents a time constant of the first-order delay control computation. In order to relax an output variation corresponding to a variation in an intermediate cycle region (about a few minutes~20 minutes) of the objective electric power system of the present invention, as the time constant Tm a value larger than 20 minutes is selected. Further, as the output power target computing unit 3-6, an example using a first-order delay control computing unit is shown, however, when the output power target computing unit 3-6 possesses a function of computing an output power target value PSC with a small temporal variation in comparison with the generation power PW, an advantage of the present embodiment can be obtained even with other constitutions than that exemplified above.

Subsequently, a proportional-integral control computing unit 3-7 computes a charge and discharge power command for PBC for the power storage system from the output power target value PSC and the output power PS. More specifically, the proportional-integral control computing unit 3-7 computes the charge and discharge power command PBC for the power storage system according to formula 5.

$$PBC = \left(Kp + \frac{Ki}{s}\right)(PSC - PS) \qquad \text{(Formula 5)}$$

Kp and Ki in formula 5 respectively represent a proportional gain constant and an integral gain constant for the proportional-integral control. A charge and discharge power command distributing unit 3-5 distributes the charge and discharge power command PBC as power commands to be charged or discharged for the respective power storage devices 2-1-1, 2-1-2, . . . , 2-1-m. A computation method performed in the charge and discharge power command distributing unit 3-5 is the same as that disclosed in the embodiment 1. As a specific operation of the charge and discharge power command distributing unit 3-5, the charge and discharge power command distributing unit 3-5 distributes uniformly to the respective power storage devices 2-1-1, 2-1-2, . . . , 2-1-m charge or discharge power commands PBC1, PBC2, . . . , PBCm to be charged or discharged from the respective power storage devices according to, for example, formula 6.

$$PBC1 = PBC2 = \ldots = PBCm = \frac{PBC}{m} \qquad \text{(Formula 6)}$$

Now, a method of preparing a power limiting command PLC for the wind power generation system will be explained. For the first time, a chargeable power computing unit 3-4-1 in the superior controller 3e computes a chargeable power PBChargeMax of the power storage system 2 from detected charge rate SOC1, SOC2, . . . SOCm of the respective power storage devices. Further, since the computation method performed in the chargeable power computing unit 3-4-1 is the same as that disclosed in the embodiment 1, the explanation thereof is omitted. Still further, the chargeable power PBChargeMax is a positive value. The superior controller 3e computes a power limiting command PLC for the wind power generation system by adding the computed output power target value PSC and chargeable power PBChargeMax. The power limiting command PLC for the wind power generation system is transmitted to the SCADA1-1 as shown in FIG. 1, and the SCADA1-1 distributes the command value to the respective wind power generation devices 1-1-1, 1-1-2, . . . , 1-1-n. Further, since the method of distributing the command value to the respective wind power generation devices 1-1-1, 1-1-2, . . . , 1-1-n performed in SCADA1-1 has been already explained in the embodiment 1, the explanation thereof is omitted herein.

Now, an exemplary operation of the wind power generation plant in the present embodiment will be explained with reference to FIGS. 39 (a) and (b). FIGS. 39 (a) and (b) are evaluations of the operation of the wind power generation plant in the present embodiment performed by a simulator. In FIGS. 39 (a) and (b), such a wind power generation plant is assumed that when the rated kW capacity of the wind power generation plant is 100%, the charge and dischargeable powers [kW] of the power storage system at charging side and discharging side are respectively 10%.

Figure 39A:
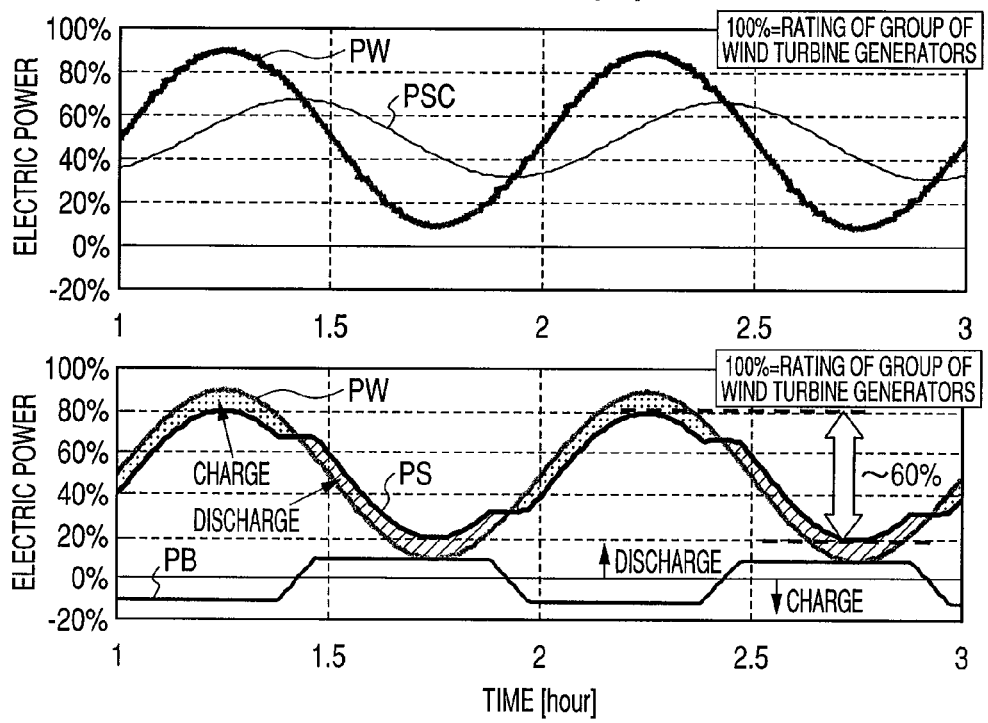
FIG. 39 (a) is a diagram showing an exemplary operation of a wind power generation plant when no power limiting control is applied to the seventh embodiment of the present invention.
Figure 39B:
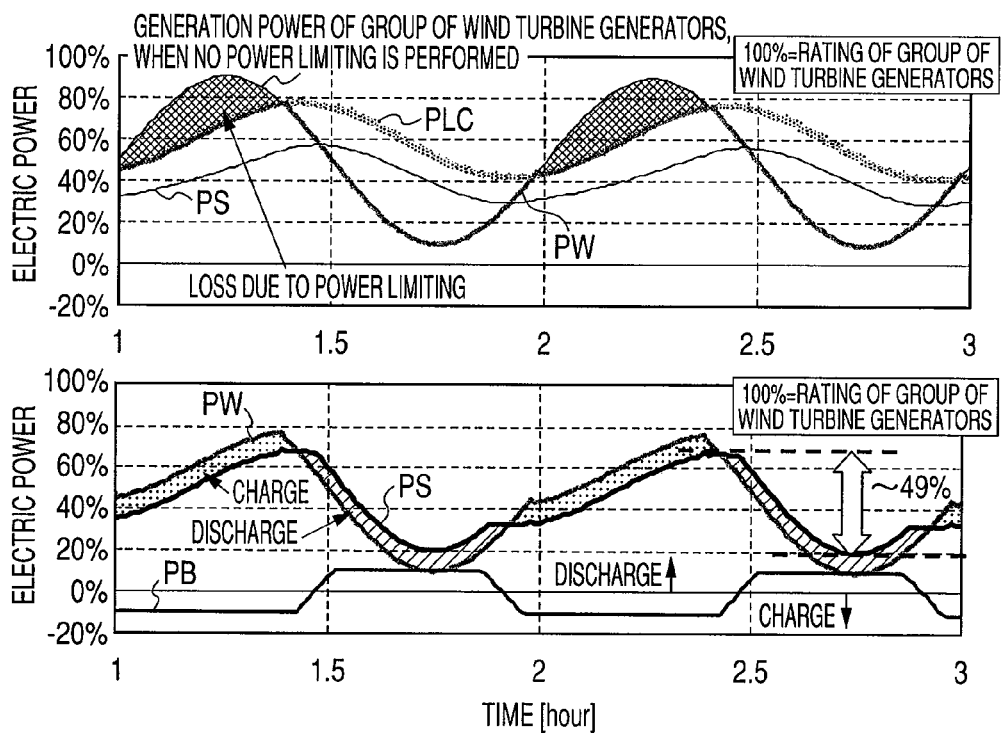

FIG. 39 (a) shows temporal variations of measured power values at respective points of the wind power generation plant and internal computation values of the superior controller 3e, when the power limiting control for the wind power generation plant as shown in the present embodiment is not used. As shown in FIG. 39 (a), with respect to the varying generation power PW in the wind power generation system 1, a value for relaxing the variation is determined as a power generation plant output command PSC for the wind power generation plant. The superior controller 3e computes a charge and discharge power command PBC to be charged or discharged by the power storage system 2 so that the output power PS of the wind power generation plant coincides with the output power command PSC, and the power storage system 2 performs a charge and discharge operation according to the charge and discharge power command PBC to output the charge and discharge power PB as the power generation plant output. In FIGS. 39 (a) and (b), since it is assumed that the charge and dischargeable power of the power storage system 2 is 10% of the rated capacity of the wind power generation plant, when a charge and discharge power more than 10% is required, the output power target value PSC does not coincide with the output power PS. For this reason, a variation of about 60% of the output power in the wind power generation plant is caused.

On the other hand, FIG. 39 (b) shows temporal variations of measured power values at respective points of the wind power generation plant and internal computation values of the superior controller 3e, when the invention as shown in the present embodiment is applied to the wind power generation plant. The condition of the kW capacity of the power storage system 2 is the same as that assumed in FIG. 39 (a). Further, as shown in FIG. 39 (b), the generation power of the wind power generation system when the wind power generation system performs no power limiting is the same as the generation power in FIG. 39 (a). The superior controller 3e of the wind power generation plant as shown in FIG. 39 (b) computes a power limiting command PLC for the wind power generation system. Since the generation power PW of the wind power generation system is limited below the power limiting command PLC, a part of power amount that would have been originally generated is lost as a loss. However, through utilization of the power limiting function, since the amount of power necessary for relaxing the variation by the power storage system 2 is limited below 10% of the chargeable power of the power storage system 2, the output power PS of the wind power generation plant can be coincided with the output power target value PSC in a section where the power storage system 2 has to charge. For this reason, a variation of the output power PS of the wind power generation plant is reduced when compared with the instance where the output power limiting function is not used (FIG. 39 (a)), and the variation is about 49% for the example as shown in FIG. 39 (b).

From the result as shown in FIGS. 39 (a) and (b), even when the capacities of the power storage systems 2 are the same, the variation in the output power PS of the wind power generation plant can be reduced by combining the output limiting function of the wind power generation system 1. Further as shown in FIG. 39 (a), when the output power of the wind power generation system is increasing (time 1~1.4 [hour]), a charging operation is performed in the wind power generation plant by the power storage system 2 with the chargeable power. A portion failed of charging is limited by the power outputting function of the wind power generation system 1. A part of the power charged by the power storage system 2 is discharged in the subsequent period (time 1.4~1.8 [hour]) requiring discharging. This implies that the loss due to limiting the power of the wind power generation system 1 is reduced by the charging operation of the power storage system 2.

As has been explained hitherto, the wind power generation plant of the present embodiment is provided with a computing unit that computes an output power target value PSC to be outputted from the wind power generation plant, another computing unit that computes a chargeable power PBChargeMax of the power storage system 2 and a still another computing unit that computes a power limiting command PLC for the wind power generation system 1 by adding the output power target value PSC and the chargeable power PBChargeMax, and wherein the wind power generation system 1 is provided with a power limiting function that suppresses the generation power PW below the power limiting command PLC. With these functions a temporal variation of the output power PS in the wind power generation plant can be reduced as well as a loss due to the power limiting function of the wind power generation system 1 can be reduced. Because of the reduction of the temporal variation of the output power PS, an adverse influence of the wind power generation plant affecting the electric power transmission system 5 can be reduced, and further, due to the reduction of the loss in the wind power generation system 1, the natural energy is further effectively utilized.

What is claimed is:

1. A wind power generation system including a group of wind turbine generators including more than one wind turbine generator, a power storage system including more than one power storage device, a superior controller configured to control the group of wind turbine generators and the power storage system, and a generation power detector to detect a generation power of the group of wind turbine generators, wherein the superior controller comprising:
   a generation power recording memory to record a sum of a generation power of the group of wind turbine generators and a charge and discharge power of the power storage system,
   a charge and discharge power command computing device for computing a charge and discharge power command for the power storage system in a second period by making use of information of the output power in a first period computed in the output power computing unit and information of a detection value at a present time from the generation power recording memory, when assuming a predetermined period from a past time to the present time as the first period and another predetermined period from the present time to a future time as the second period,
   a charge and discharge power control device for controlling the charge and discharge power according to the charge and discharge power command by the power storage system,
   a maximum value and minimum value computing unit for determining the maximum value and the minimum value of the output power in the first period, and
   an output range computing unit for determining an output range of the output power in the second period from the maximum value and the minimum value,
   wherein the charge and discharge power command computing unit is further configured to compute the charge and discharge power command for the power storage system from a power deviated from the output range, when the generation power of the group of wind turbine generators deviates from the output range in the second period.

2. A wind power generation system according to claim 1, the superior controller further comprising:
   a target charge rate range computing unit for computing a target charge rate range with regard to charge rate of the power storage system;
   for an instance when the generation power of the group of wind turbine generators deviates from the output range or when the charge rate of the power storage system deviates from the target charge rate range, a charging or discharging device for charging or discharging by the power storage system.

3. A wind power generation system according to claim 2, the superior controller further comprising:
   a target charge rate range determining unit for determining the target charge rate range of the power storage system from the generation power of the group of wind turbine generators.

4. A wind power generation system according to claim 1, the superior controller further comprising:
- a first order delay computing unit for computing a first value obtained by applying a first order delay to the generation power of the group of wind turbine generators;
- for an instance when the first value is within the output range, a charge and discharge control unit for causing to perform the charge and discharge control of the power storage system so that the output power of the wind power generation system follows up the first value; and
- for an instance when the first value deviates from the output range, a charge and discharge command preparing unit for preparing the charge and discharge command of the power storage system so that the output power of the wind power generation system follows up an upper limit or a lower limit of the output range.

5. A wind power generation system according to claim 1, wherein the first period is a fixed value less than 20 minutes and the second period is a fixed value less than one minute.

6. A wind power generation system according to claim 1, wherein an upper limit value of the output range is a value obtained by adding a first predetermined value to the minimum value, a lower limit value of the output range is a value obtained by subtracting the first predetermined value from the maximum value and the first predetermined value is a fixed value set in relation to an allowable variation width of the output power of the wind power generation system.

7. A wind power generation system according to claim 1, the superior controller further comprising:
- a receiving unit for receiving a generation power prediction value for predicting a generation power of the group of wind turbine generators in future; and
- an adjusting unit of target charge rate range for adjusting the target charge rate range in response to the generation power prediction value.

8. A wind power generation system according to claim 1, the superior controller comprising:
- a power limiting command preparing unit for preparing a power limiting command of the group of wind turbine generators, and characterized in that the group of wind turbine generators comprising a generation power limiting unit for limiting the generation power below the power limiting command.

9. A wind power generation system according to claim 1, the superior controller further comprising:
- a power limiting command preparing unit for preparing a power limiting command of the group of wind turbine generators, a minimum value of the output power determining unit for determining the minimum value of the output power in the first period; and
- a chargeable power computing unit for computing a chargeable power of the power storage system, and characterized in that the group of wind turbine generators comprising a generation power limiting unit for limiting the generation power below the power limiting command; and
- a power limiting command preparing unit for preparing a power limiting command prepares a sum of the minimum value, the chargeable power and the fixed value set in relation to an allowable variation width of the output power of the wind power generation system as the power limiting value.

10. A wind power generation system according to claim 1, the superior controller further comprising:
- a power limiting command computing unit for computing a power limiting command of the group of wind turbine generators, and characterized in that the group of wind turbine generators comprising a generation power limiting unit for limiting the generation power thereof below the power limiting command, and further characterized by comprising:
- a receiving unit for receiving a generation power prediction value of the wind power generation system; and
- a power limiting command varying unit for varying the power limiting command in response to the generation power prediction value.

11. A wind power generation system according to claim 9, the superior controller further comprising:
- an output power upper limit command computing unit for computing an output power upper limit command of the output power; and
- an output power limiting unit for limiting the output power below the output power limit command through a charging operation of the power storage system and a power limiting operation of the group of wind turbine generators.

12. A wind power generation system according to claim 10, the superior controller further comprising:
- an output power upper limit command computing unit for computing an output power upper limit command of the output power; and
- an output power limiting unit for limiting the output power below the output power limit command through a charging operation of the power storage system and a power limiting operation of the group of wind turbine generators.

13. A wind power generation system according to claim 11, wherein the output power upper limit command is a fixed value and is below a value of generation power rating of the group of wind turbine generators as well as is above a rated capacity of a converter constituting the power storage system.

14. A wind power generation system according to claim 12, wherein the output power upper limit command is a fixed value and is below a value of generation power rating of the group of wind turbine generators as well as is above a rated capacity of a converter constituting the power storage system.

15. A wind power generation system according to claim 11, wherein the output power upper limit command is adjusted in response to the generation power prediction value.

16. A wind power generation system according to claim 12, wherein the output power upper limit command is adjusted in response to the generation power prediction value.

17. A wind power generation system according to claim 11, wherein the output power upper limit command is adjusted in response to the charge rate of the power storage system or an accumulated energy of the power storage system.

18. A wind power generation system according to claim 12, wherein the output power upper limit command is adjusted in response to the charge rate of the power storage system or an accumulated energy of the power storage system.

* * * * *